United States Patent
Suzuki et al.

(10) Patent No.: US 10,961,458 B2
(45) Date of Patent: Mar. 30, 2021

(54) LIQUID CRYSTAL COMPOSITION, OPTICAL FILM, POLARIZING PLATE, AND IMAGE DISPLAY DEVICE

(71) Applicant: FUJIFILM Corporation, Tokyo (JP)

(72) Inventors: Masaaki Suzuki, Kanagawa (JP); Shunya Katoh, Kanagawa (JP); Koji Iijima, Kanagawa (JP); Yuki Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 92 days.

(21) Appl. No.: 16/360,441

(22) Filed: Mar. 21, 2019

(65) Prior Publication Data

US 2019/0218460 A1   Jul. 18, 2019

Related U.S. Application Data

(63) Continuation of application No. PCT/JP2017/034449, filed on Sep. 25, 2017.

(30) Foreign Application Priority Data

Sep. 30, 2016  (JP) .............. JP2016-194277

(51) Int. Cl.
| | | |
|---|---|---|
| C09K 19/38 | (2006.01) | |
| C09K 19/54 | (2006.01) | |
| C09K 19/46 | (2006.01) | |
| C09K 19/20 | (2006.01) | |
| G02F 1/1335 | (2006.01) | |
| C09K 19/40 | (2006.01) | |
| G02B 5/30 | (2006.01) | |
| C09K 19/04 | (2006.01) | |

(52) U.S. Cl.
CPC ........ *C09K 19/542* (2013.01); *C09K 19/2007* (2013.01); *C09K 19/3842* (2013.01); *C09K 19/404* (2013.01); *C09K 19/46* (2013.01); *C09K 19/54* (2013.01); *G02B 5/30* (2013.01); *G02F 1/1335* (2013.01); *C09K 2019/0448* (2013.01); *C09K 2019/2078* (2013.01); *C09K 2019/548* (2013.01)

(58) Field of Classification Search
CPC .................................................. C09K 19/54
See application file for complete search history.

(56) References Cited

U.S. PATENT DOCUMENTS

2016/0223719 A1* 8/2016 Ishiguro .............. G02B 5/3025

FOREIGN PATENT DOCUMENTS

| JP | 2006124639 A | * | 5/2006 | |
| JP | 2006124639 A |   | 5/2006 | |
| JP | 2006309120 A | * | 11/2006 | |
| JP | 2006309120 A |   | 11/2006 | |
| JP | 2015106122 A |   | 6/2015 | |
| JP | 2016051178 A |   | 4/2016 | |
| WO | 2014199934 A1 |   | 12/2014 | |
| WO | WO-2015053359 A1 | * | 4/2015 | ............. B32B 27/06 |

OTHER PUBLICATIONS

International Search Report Issued in PCT/JP2017/034449 dated Nov. 28, 2017.
Written Opinion Issued in PCT/JP2017/034449 dated Nov. 28, 2017.
International Preliminary Report on Patentability Issued in PCT/JP2017/034469 dated Apr. 2, 2019.
Office Action, issued by the Korean Intellectual Property Offcie dated Jul. 7, 2020, in connection with Japanese Patent Application No. 10-2019-7009079.
Office Action which was issued by the Japanese Patent Office dated Nov. 26, 2019, in connection with Japanese patent Application No. 2018-542533.
Extended European Search Report, issued by the European Patent Office dated Sep. 12, 2019, in connection with European Patent Application No. 17856021.5.
First Office Action which was issues by The State Intellectual Property Office of People's Republic of China dated Oct. 9, 2020, in connection with Chinese Patent Application No. 201780059217.1.

* cited by examiner

*Primary Examiner* — Chanceity N Robinson
(74) *Attorney, Agent, or Firm* — Edwards Neils LLC; Jean C. Edwards, Esq.

(57) ABSTRACT

A liquid crystal composition is provided which has excellent alignment properties, improves a surface state of an optically anisotropic layer to be formed, and improves adhesiveness with a polarizer, an optical film using the same, a polarizing plate, and an image display device. The liquid crystal composition according to the present invention is a liquid crystal composition containing a copolymer having a repeating unit represented by Formula (I) and a repeating unit represented by Formula (II), and a liquid crystal compound.

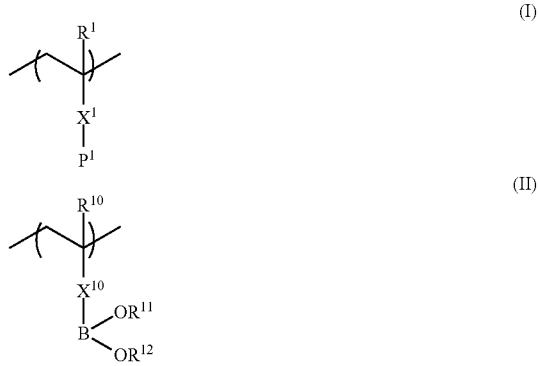

22 Claims, No Drawings

LIQUID CRYSTAL COMPOSITION, OPTICAL FILM, POLARIZING PLATE, AND IMAGE DISPLAY DEVICE

CROSS-REFERENCE TO RELATED APPLICATIONS

This application is a Continuation of PCT International Application No. PCT/JP2017/034449 filed on Sep. 25, 2017, which was published under PCT Article 21(2) in Japanese, and which claims priority under 35 U.S.C. § 119(a) to Japanese Patent Application No. 2016-194277 filed on Sep. 30, 2016. The above applications are hereby expressly incorporated by reference, in their entirety, into the present application.

BACKGROUND OF THE INVENTION

1. Field of the Invention

The present invention relates to a liquid crystal composition, an optical film, a polarizing plate, and an image display device.

2. Description of the Related Art

It is known that a polarizing plate is used as a member of a liquid crystal display (LCD), an organic light emitting diode (OLED), and the like and plays an important role in display performance.

In addition, an ordinary polarizing plate adopts a configuration in which an optical film is laminated on one surface or both surfaces of a polarizer in which a dichroic dye such as an iodine complex is adsorbed and aligned in a polyvinyl alcohol (PVA)-based resin.

As an optical film to be laminated on a polarizer, an optical film having an optically anisotropic layer (phase difference layer) in which a liquid crystal compound is aligned on a support of triacetyl cellulose (TAC) or the like and the alignment state thereof is immobilized is known.

In addition, a polarizing plate in which such an optical film is used generally has a configuration in which a polarizer and a support of the optical film are laminated using a polyvinyl alcohol-based adhesive or the like.

In recent years, from the viewpoint of widening the viewing angle and thinning of a polarizing plate and the like, a configuration in which a polarizer and an optically anisotropic layer of an optical film are laminated and a configuration in which a polarizer and an optically anisotrpic layer of an optical film are laminated and then a support is peeled off have been proposed (for example, refer to WO2014/199934A).

SUMMARY OF THE INVENTION

The present inventors have conducted investigations on the lamination of the polarizer and the optically anisotropic layer of the optical film described in WO2014/199934A, and have found that depending on the kind of additive to be added from the viewpoint of the alignment of the liquid crystal compound and the surface state of the optically anisotropic layer, the optically anisotropic layer to be formed becomes hydrophobic and, in general, adhesiveness with a hydrophilic polarizer may be inferior in some cases.

An object of the present invention is to provide a liquid crystal composition which has excellent alignment properties, improves the surface state of an optically anisotropic layer to be formed, and improves adhesiveness with a polarizer, an optical film using the same, a polarizing plate, and an image display device.

As a result of conducting intensive investigations to achieve the above object, the present inventors have found that by using a liquid crystal composition containing a copolymer having two or more kinds of predetermined repeating units, excellent alignment properties are obtained, the surface state of an optically anisotropic layer to be formed is improved, and adhesiveness with a polarizer is improved, and thus have completed the present invention.

That is, it has been found that the above object can be achieved by the following constitutions.

[1] A liquid crystal composition comprising: a copolymer having a repeating unit represented by Formula (I) and a repeating unit represented by Formula (II); and a liquid crystal compound,

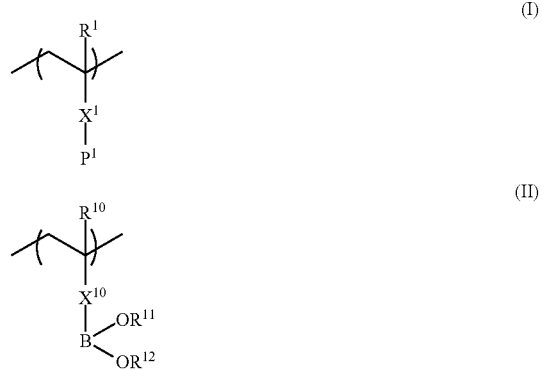

in Formula (I), $R^1$ represents a hydrogen atom or an alkyl group having 1 to 20 carbon atoms; $X^1$ represents a single bond or a divalent linking group selected from the group consisting of —O—, —S—, —COO—, —OCO—, —CONR$^2$—, —NR$^2$COO—, —CR$^2$N—, a substituted or unsubstituted divalent aliphatic group, a substituted or unsubstituted divalent aromatic group, and a combination thereof; $R^2$ represents a hydrogen atom, an alkyl group having 1 to 20 carbon atoms, or —X$^1$—P$^1$; and $P^1$ represents a polymerizable group, and in Formula (II), $R^{10}$ represents a hydrogen atom or an alkyl group having 1 to 20 carbon atoms; $R^{11}$ and $R^{12}$ each independently represent a hydrogen atom, a substituted or unsubstituted aliphatic hydrocarbon group, a substituted or unsubstituted aryl group, or a substituted or unsubstituted heteroaryl group; $R^{11}$ and $R^{12}$ may be linked to each other through an alkylene linking group, an arylene linking group, or a linking group of a combination thereof; $X^{10}$ represents a single bond or a divalent linking group selected from the group consisting of —O—, —S—, —COO—, —OCO—, —CONR$^{13}$—, —NR$^{13}$COO—, —CR$^{13}$N—, a substituted or unsubstituted divalent aliphatic group, a substituted or unsubstituted divalent aromatic group, and a combination thereof; and $R^{13}$ represents a hydrogen atom or an alkyl group having 1 to 20 carbon atoms.

[2] The liquid crystal composition according to [1], in which the copolymer further has a repeating unit represented by Formula (III),

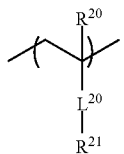
(III)

in Formula (III), $R^{20}$ represents a hydrogen atom or an alkyl group having 1 to 20 carbon atoms; $R^{21}$ represents an alkyl group having 4 to 20 carbon atoms, an alkyl group having 1 to 20 carbon atoms in which at least one hydrogen atom is substituted with a fluorine atom, or a monovalent organic group including —Si($R^{a3}$)($R^{a4}$)O—; $R^{a3}$ and $R^{a4}$ each independently represent an alkyl group, a haloalkyl group, or an aryl group; and $L^{20}$ represents a divalent linking group selected from the group consisting of —O—, —COO—, —OCO—, a divalent aliphatic group, and a combination thereof.

[3] The liquid crystal composition according to [2], in which $R^{21}$ in Formula (III) is an alkyl group having 1 to 20 carbon atoms in which at least one hydrogen atom is substituted with a fluorine atom.

[4] The liquid crystal composition according to [3], in which the repeating unit represented by Formula (III) is a repeating unit represented by Formula (IV),

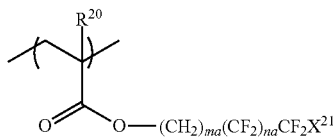
(IV)

in Formula (IV), $R^{20}$ represents a hydrogen atom or an alkyl group having 1 to 20 carbon atoms; ma and na each independently represent an integer of 0 to 19; where ma and na represent an integer of 0 to 19 in total; and $X^{21}$ represents a hydrogen atom or a fluorine atom.

[5] The liquid crystal composition according to any one of [2] to [4], in which a content of the repeating unit represented by Formula (I) is 10% to 50% by mass with respect to all repeating units, a content of the repeating unit represented by Formula (II) is 5% to 50% by mass with respect to all repeating units, and a content of the repeating unit represented by Formula (III) is 10% to 60% by mass with respect to all repeating units in the copolymer.

[6] The liquid crystal composition according to any one of [1] to [5], in which the polymerizable group represented by $P^1$ in Formula (I) is any polymerizable group selected from the group consisting of groups represented by Formulae (P-1) to (P-7),

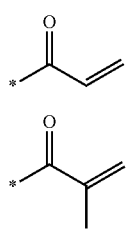
(P-1)

(P-2)

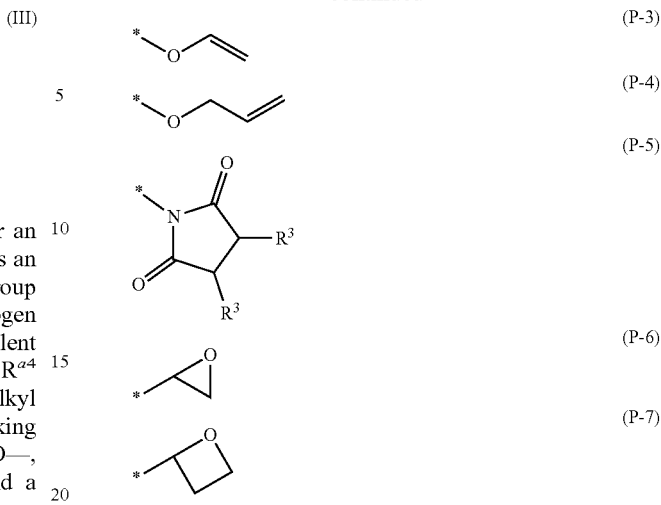
(P-3)

(P-4)

(P-5)

(P-6)

(P-7)

in Formulae (P-1) to (P-7), * represents a bonding position with $X^1$; $R^3$ represents a hydrogen atom or an alkyl group having 1 to 5 carbon atoms; and two $R^3$'s may be the same or different from each other and may be linked to each other to form a ring structure.

[7] The liquid crystal composition according to any one of [1] to [6], in which the copolymer further has a repeating unit represented by Formula (V),

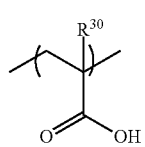
(V)

in Formula (V), $R^{30}$ represents a hydrogen atom or an alkyl group having 1 to 20 carbon atoms.

[8] The liquid crystal composition according to any one of [1] to [7], in which the liquid crystal compound is a rod-like liquid crystal compound having a polymerizable group or a disk-like liquid crystal compound having a polymerizable group.

[9] The liquid crystal composition according to any one of [1] to [8], further comprising: a compound represented by Formula (VI) at a content of 0.5% to 7.0% by mass with respect to the liquid crystal compound, $$(Z)_n\text{-}L^{100}\text{-}(Q)_m \qquad (VI)$$

in Formula (VI), Z represents a substituent having a polymerizable group; n represents an integer of 0 to 4; in a case where n is 2 or greater, two or more Z's may be the same or different from each other; Q represents a substituent containing at least one boron atom; m represents 1 or 2; in a case where m is 2, two Q's may be the same or different from each other; $L^{100}$ represents an n+m valent linking group; where in a case where n is 0 and m is 1, $L^{100}$ represents a hydrogen atom, a substituted or unsubstituted alkyl group, a substituted or unsubstituted alkenyl group, a substituted or unsubstituted alkynyl group, a substituted or unsubstituted aryl group, or a substituted or unsubstituted heteroaryl group.

[10] An optical film comprising: an optically anisotropic layer obtained by polymerizing the liquid crystal composition according to any one of [1] to [9].

[11] The optical film according to [10], further comprising: a support, in which the optically anisotropic layer is provided on the support.

[12] The optical film according to [11], in which the copolymer included in the liquid crystal composition according to any one of [1] to [9] is unevenly distributed on an air interface side of the optically anisotropic layer.

[13] The optical film according to [11] or [12], in which the optically anisotropic layer is an optically anisotropic layer that is obtained by polymerizing the liquid crystal composition according to [9], and the compound represented by Formula (VI) included in the liquid crystal composition according to [9] is unevenly distributed on the support side of the optically anisotropic layer.

[14] The optical film according to any one of [11] to [13], in which the support is a cellulose acylate-based film or a cycloolefin-based film.

[15] A polarizing plate comprising: the optical film according to any one of [10] to [14]; and a polarizer, in which the optically anisotropic layer included in the optical film and the polarizer are laminated through an adhesive layer.

[16] An image display device comprising: the optical film according to any one of [10] to [14] or the polarizing plate according to [15]; and an image display element.

According to the present invention, it is possible to provide a liquid crystal composition which has excellent alignment properties, improves a surface state of an optically anisotropic layer to be formed, and improves adhesiveness with a polarizer, an optical film using the same, a polarizing plate, and an image display device.

DESCRIPTION OF THE PREFERRED EMBODIMENTS

Hereinafter, the present invention will be described in detail.

Descriptions of the constitutional elements described below are sometimes made based on representative embodiments of the present invention, but the present invention is not limited to such embodiments.

The numerical range which is shown by "to" used in the present specification means the range including the numerical values described before and after "to" as the lower limit and the upper limit, respectively.

In addition, the expression "(meth)acrylate" is used to refer to "one or both of acrylate and methacrylate". The same applies to (meth)acrylic acid, (meth)acrylamide, (meth)acryloyl group, and the like.

[Liquid Crystal Composition]

A liquid crystal composition according to an embodiment of the present invention is a liquid crystal composition containing a copolymer having a repeating unit represented by Formula (I) described later and a repeating unit represented by Formula (II) described later, and a liquid crystal compound.

In the present invention, as described above, by using the liquid crystal composition containing the copolymer having the repeating unit represented by Formula (I) described later and the repeating unit represented by Formula (II) described later, excellent alignment properties are obtained, the surface state of an optically anisotropic layer to be formed is improved, and the adhesiveness with a polarizer is improved.

Although the details thereof are not clear, the present inventors assume as follows.

That is, it is considered that due to the fact that the repeating unit represented by Formula (I) included in the copolymer contributes to the crosslinking reaction with the liquid crystal compound and the repeating unit represented by Formula (II) included in the copolymer contributes to the affinity with the surface of a polarizer, the alignment properties of the liquid crystal compound are improved, the surface state of an optically anisotropic layer to be formed is improved, and the adhesiveness with a polarizer is improved.

Hereinafter, each component of the liquid crystal composition according to the embodiment of the present invention will be described in detail.

[Copolymer]

The copolymer contained in the liquid crystal composition according to the embodiment of the present invention (hereinafter, in the present specification, formally abbreviated as "polymer compound of the present invention") is a copolymer having a repeating unit represented by Formula (I) (hereinafter, abbreviated as "I part") and a repeating unit represented by Formula (II) (hereinafter, abbreviated as "II part").

In addition, it is preferable that the polymer compound of the present invention has a repeating unit represented by Formula (III) (hereinafter, abbreviated as "III part").

Further, it is preferable that the polymer compound of the present invention has a repeating unit represented by Formula (V) (hereinafter, abbreviated as "V part").

(I)

(II)

(III)

(V)

<I Part>

The I part of the polymer compound of the present invention is a repeating unit represented by Formula (I).

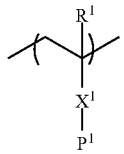

(I)

In Formula (I), $R^1$ represents a hydrogen atom or an alkyl group having 1 to 20 carbon atoms. Of these, a hydrogen atom or an alkyl group having 1 to 10 carbon atoms is preferable, a hydrogen atom or an alkyl group having 1 to 4 carbon atoms is more preferable, and a hydrogen atom or a methyl group is even more preferable.

In addition, in Formula (I), $X^1$ represents a single bond or a divalent linking group selected from the group consisting of —O—, —S—, —COO—, —OCO—, —CONR²—, —NR²COO—, —CR²N—, a substituted or unsubstituted divalent aliphatic group, a substituted or unsubstituted divalent aromatic group, and a combination thereof, and $R^2$ represents a hydrogen atom, an alkyl group having 1 to 20 carbon atoms, or —X¹—P¹. In a case where $R^2$ is —X¹—P¹, $P^1$ represents a polymerizable group as $P^1$ in Formula (I).

Here, examples of the substituted or unsubstituted divalent aliphatic group represented by $X^1$ include an alkylene group having 1 to 20 carbon atoms which may have a substituent, or a cycloalkylene group having 3 to 20 carbon atoms which may have a substituent (for example, cyclohexylene group). Of these, an alkylene group having 1 to 15 carbon atoms is preferable, an alkylene group having 1 to 8 carbon atoms is more preferable, and a methylene group, an ethylene group, a propylene group, and a butylene group are even more preferable.

In addition, examples of the substituted or unsubstituted divalent aromatic group represented by $X^1$ include a divalent aromatic hydrocarbon group which may have a substituent or a divalent aromatic heterocyclic group which may have a substituent. Examples of the divalent aromatic hydrocarbon group include groups obtained by respectively removing one hydrogen atom from two carbon atoms constituting a ring structure of an aromatic hydrocarbon ring such as a benzene ring, a naphthalene ring, an anthracene ring, a triphenylene ring, and a fluorene ring. Of these, a phenylene group or a naphthylene group obtained by respectively removing one hydrogen atom from two carbon atoms constituting the ring structure of a benzene ring or a naphthalene ring is preferable. On the other hand, examples of the divalent aromatic heterocyclic group include groups obtained by respectively removing one hydrogen atom from two carbon atoms constituting a ring structure of an aromatic heterocyclic ring of a furan ring, a pyrrole ring, a thiophene ring, a pyridine ring, a thiazole ring, a benzothiazole ring, an oxadiazole ring, a thiazolothiazole ring, and a phenanthroline ring.

Examples of the substituent which the divalent aliphatic group or the divalent aromatic group may have include a halogen atom, a hydroxyl group, an amino group, an acryloyloxy group, a methacryloyloxy group, an alkyl group having 1 to 20 carbon atoms, a carboxyl group, a cyano group, —X¹—P¹, and groups obtained by combining one or more of —O—, —S—, —COO—, —OCO—, —CONR²—, —NR²COO—, —HC=CH—, and —CR²N— with these groups. $R^2$ represents a hydrogen atom, an alkyl group having 1 to 20 carbon atoms, or —X¹—P¹. In a case where $R^2$ is —X¹—P¹, $P^1$ represents a polymerizable group as $P^1$ in Formula (I).

The alkyl group having 1 to 20 carbon atoms represented by $R^2$ is preferably an alkyl group having 1 to 6 carbon atoms, and specific examples thereof include a methyl group, an ethyl group, a propyl group, an isopropyl group, an n-butyl group, an isobutyl group, a sec-butyl group, a tert-butyl group, an n-pentyl group, and an n-hexyl group.

In addition, in Formula (I), $P^1$ represents a polymerizable group.

In the present invention, the polymerizable group represented by $P^1$ in Formula (I) is preferably any polymerizable group selected from the group consisting of groups represented by Formulae (P-1) to (P-7). Among these, any polymerizable group selected from the group consisting of groups represented by Formulae (P-1) to (P-3) is more preferable, and a polymerizable group represented by Formula (P-1) or (P-2) is even more preferable.

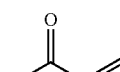

(P-1)

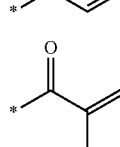

(P-2)

(P-3)

(P-4)

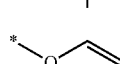

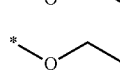

(P-5)

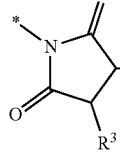

(P-6)

(P-7)

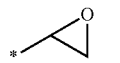

In Formulae (P-1) to (P-7), * represents a bonding position with $X^1$. $R^3$ represents a hydrogen atom or an alkyl group having 1 to 5 carbon atoms, and two $R^3$'s may be the same or different from each other and may be linked to each other to form a ring structure.

In addition, specific examples of the alkyl group having 1 to 5 carbon atoms represented by $R^3$ include a methyl group, an ethyl group, a propyl group, an isopropyl group, and an n-butyl group.

In the present invention, from the viewpoint of ease of production, economic efficiency, and radical polymerizability, as the repeating unit represented by Formula (I), a repeating unit in which $R^1$ in Formula (I) is a hydrogen atom or a methyl group, and $X^1$ in Formula (I) is a divalent linking group selected from the group consisting of —O—, —COO—, —OCO—, a substituted or unsubstituted divalent aliphatic group (preferably, an alkylene group having 2 to 8 carbon atoms), and a combination thereof is preferable.

Specific examples of the repeating unit represented by Formula (I) include repeating units represented by the following formulae.

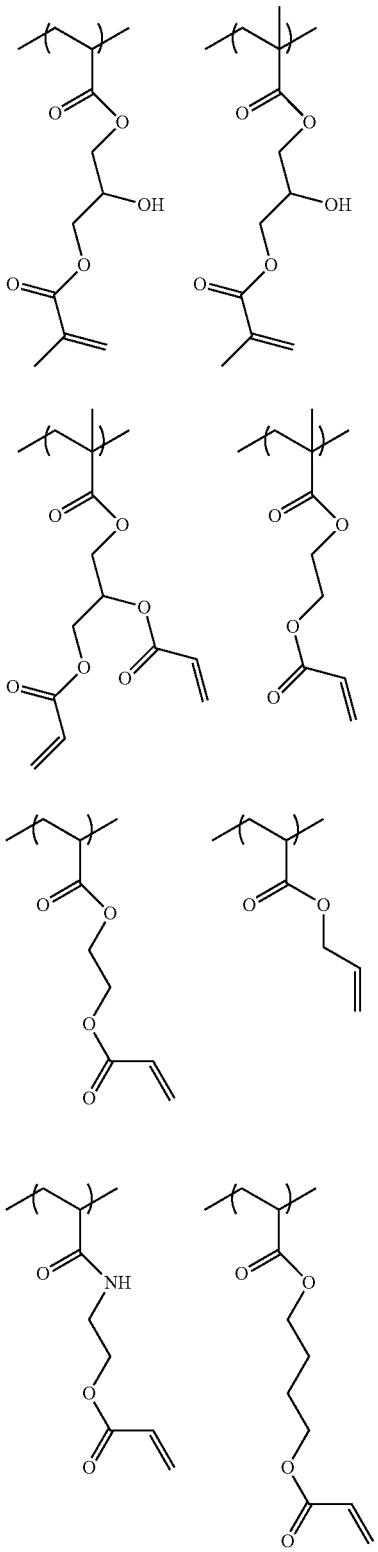

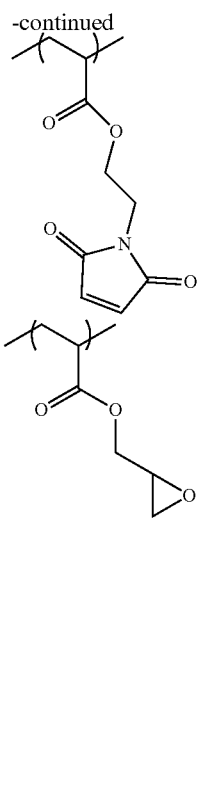
-continued

In the present invention, the content of the repeating unit represented by Formula (I) is preferably 5% to 80% by mass, more preferably 7% to 70% y mass, and even more preferably 10% to 50% by mass with respect to all repeating units.

<II Part>

The II part of the polymer compound of the present invention is a repeating unit represented by Formula (II).

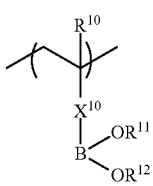

(II)

In Formula (II), $R^{10}$ represents a hydrogen atom or an alkyl group having 1 to 20 carbon atoms. Of these, a hydrogen atom or an alkyl group having 1 to 10 carbon atoms is preferable, a hydrogen atom or an alkyl group having 1 to 4 carbon atoms is more preferable, and a hydrogen atom or a methyl group is even more preferable.

In addition, in Formula (II), $X^{10}$ represents a single bond or a divalent linking group selected from the group consisting of —O—. —S—, —COO—, —OCO—, —CONR$^{13}$—, —NR$^{13}$COO—, —CR$^{13}$N—, a substituted or unsubstituted divalent aliphatic group, a substituted or unsubstituted divalent aromatic group, and a combination thereof; and $R^{13}$ represents a hydrogen atom or an alkyl group having 1 to 20 carbon atoms.

Here, examples of the divalent aliphatic group and the divalent aromatic group represented by $X^{10}$ include the same groups as those described for $X^1$ in Formula (I), and examples of the alkyl group having 1 to 20 carbon atoms represented by $R^{13}$ include the same groups as those described for $R^2$ in connection with Formula (I).

In addition, in Formula (II), $R^{11}$ and $R^{12}$ each independently represent a hydrogen atom or a substituted or unsubstituted aliphatic hydrocarbon group, a substituted or unsubstituted aryl group, or a substituted or unsubstituted heteroaryl group, and $R^{11}$ and $R^{12}$ may be linked to each other through an alkylene linking group, an arylene linking group, or a linking group of a combination thereof.

Examples of the substituted or unsubstituted aliphatic hydrocarbon group represented by $R^{11}$ and $R^{12}$ include an alkyl group, an alkenyl group or an alkynyl group, which may have a substituent.

Specific examples of the alkyl group include linear, branched, or cyclic alkyl groups such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, a 2-methylhexyl group, a cyclopentyl group, a cyclohexyl group, a 1-adamantyl group, and a 2-norbornyl group.

Specific examples of the alkenyl group include linear, branched, or cyclic alkenyl groups such as a vinyl group, a 1-propenyl group, a 1-butenyl group, a 1-methyl-1-propenyl group, a 1-cyclopentenyl group, and a 1-cyclohexenyl group.

Specific examples of the alkynyl group include an ethynyl group, a 1-propynyl group, a 1-butynyl group, and a 1-octynyl group.

Specific examples of the substituted or unsubstituted aryl group represented by $R^{11}$ and $R^{12}$ include one in which one to four benzene rings form a fused ring, and one in which a benzene ring and an unsaturated five-membered ring form a fused ring. Specific examples thereof include a phenyl group, a naphthyl group, an anthryl group, a phenanthryl group, an indenyl group, an acenaphthenyl group, a fluorenyl group, and a pyrenyl group.

Examples of the substituted or unsubstituted heteroaryl group represented by $R^{11}$ and $R^{12}$ include one in which one hydrogen atom on a heteroaromatic ring containing one or more hetero atoms selected from the group consisting of a nitrogen atom, an oxygen atom and a sulfur atom is eliminated to form a heteroaryl group.

Specific examples of the heteroaromatic ring containing one or more hetero atoms selected from the group consisting of a nitrogen atom, an oxygen atom and a sulfur atom include pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazole benzimidazole, anthranil, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, and pteridine.

As the substituent which $R^{11}$ and $R^{12}$ may have, a monovalent nonmetallic atomic group excluding hydrogen can be exemplified and for example, the substituent is selected from the following substituent group Y:

(Substituent Group Y)

Halogen atom (—F, —Br, —Cl, —I), hydroxyl group, alkoxy group, aryloxy group, mercapto group, alkyl thio group, aryl thio group, alkyl dithio group, aryl dithio group, amino group, N-alkyl amino group, N,N-dialkyl amino group, N-aryl amino group, N,N-diaryl amino group, N-alkyl-N-aryl amino group, acyloxy group, carbamoyloxy group, N-alkylcarbamoyloxy group, N-aryl carbamoyloxy group, N,N-dialkyl carbamoyloxy group, N,N-diaryl carbamoyloxy group, N-alkyl-N-aryl carbamoyloxy group, alkyl sulfoxy group, aryl sulfoxy group, acyl thio group, acyl amino group, N-alkyl acyl amino group, N-aryl acyl amino group, ureido group, N'-alkyl ureido group, N',N'-dialkyl ureido group, N'-aryl ureido group, N',N'-diaryl ureido group, N'-alkyl-N'-aryl ureido group, N-alkyl ureido group, N-aryl ureido group, N'-alkyl-N-alkyl ureido group, N'-alkyl-N-aryl ureido group, N',N'-dialkyl-N-alkyl ureido group, N',N'-dialkyl-N-aryl ureido group, N'-aryl-N-alkyl ureido group, N'-aryl-N-aryl ureido group, N',N'-diaryl-N-alkyl ureido group, N',N'-diaryl-N-aryl ureido group, N'-alkyl-N'-aryl-N-alkyl ureido group, N'-alkyl-N'-aryl-N-aryl ureido group, alkoxy carbonyl amino group, aryloxy carbonyl amino group, N-alkyl-N-alkoxycarbonyl amino group, N-alkyl-N-aryloxy carbonyl amino group, N-aryl-N-alkoxycarbonyl amino group, N-aryl-N-aryloxycarbonyl amino group, formyl group, acyl group, carboxyl group and its conjugated basic group, alkoxy carbonyl group, aryloxy carbonyl group, carbamoyl group, N-alkyl carbamoyl group, N,N-dialkyl carbamoyl group, N-aryl carbamoyl group, N,N-diaryl carbamoyl group, N-alkyl-N-aryl carbamoyl group, alkyl sulfinyl group, aryl sulfinyl group, alkyl sulfonyl group, aryl sulfonyl group, sulfo group (—SO$_3$H) and its conjugated basic group, alkoxy sulfonyl group, aryloxy sulfonyl group, sulfinamoyl group, N-alkyl sulfinamoyl group, N,N-dialkyl sulfinamoyl group, N-aryl sulfinamoyl group, N,N-diaryl sulfinamoyl group, N-alkyl-N-aryl sulfinamoyl group, sulfamoyl group, N-alkyl sulfamoyl group, N,N-dialkyl sulfamoyl group, N-aryl sulfamoyl group, N,N-diaryl sulfamoyl group, N-alkyl-N-aryl sulfamoyl group, N-acyl sulfamoyl group and its conjugated basic group, N-alkyl sulfonyl sulfamoyl group (—SO$_2$NHSO$_2$(alkyl)) and its conjugated basic group, N-aryl sulfonyl sulfamoyl group (—SO$_2$NHSO$_2$(aryl)) and its conjugated basic group, N-alkyl sulfonyl carbamoyl group (—CONHSO$_2$(alkyl)) and its conjugated basic group, N-aryl sulfonyl carbamoyl group (—CONHSO$_2$(aryl)) and its conjugated basic group, alkoxy silyl group (—Si(Oalkyl)$_3$), aryloxy silyl group (—Si(Oaryl)$_3$), hydroxysilyl group (—Si(OH)$_3$) and its conjugated basic group, phosphono group (—PO$_3$H$_2$) and its conjugated basic group, dialkyl phosphono group (—PO$_3$(alkyl)$_2$), diaryl phosphono group (—PO$_3$(aryl)$_2$), alkyl aryl phosphono group (—PO$_3$(alkyl)(aryl)), monoalkyl phosphono group (—PO$_3$H(alkyl)) and its conjugated basic group, monoaryl phosphono group (—PO$_3$H(aryl)) and its conjugated basic group, phosphonoxy group (—OPO$_3$H$_2$) and its conjugated basic group, dialkyl phosphonoxy group (—OPO$_3$(alkyl)$_2$), diaryl phosphonoxy group (—OPO$_3$(aryl)), alkyl aryl phosphonoxy group (—OPO$_3$(alkyl)(aryl)), monoalkyl phosphonoxy group (—OPO$_3$H(alkyl)) and its conjugated basic group, monoaryl phosphonoxy group (—OPO$_3$H(aryl)) and its conjugated basic group, cyano group, nitro group, aryl group, alkenyl group, and alkynyl group. In addition, if possible, these substituents may be bonded to one another or to a substituted hydrocarbon group to form a ring.

It is preferable that $R^{11}$ and $R^{12}$ in Formula (II) represent hydrogen atoms or are linked to each other through an alkylene linking group.

Specific examples of the monomer forming the repeating unit represented by Formula (II) include monomers represented by Formulae II-1 to II-12.

II-1
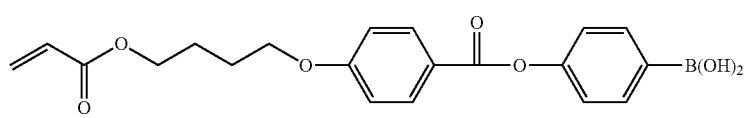
II-2
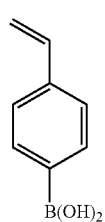
II-3
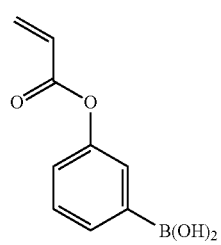
II-4
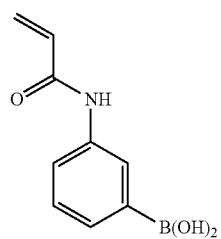
II-5
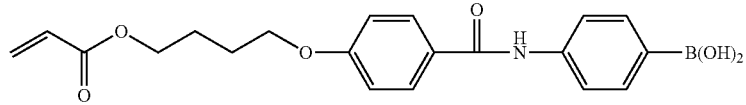
II-6
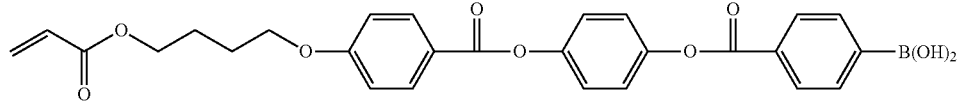
II-7
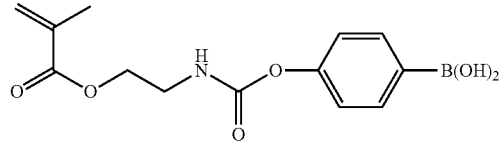
II-8
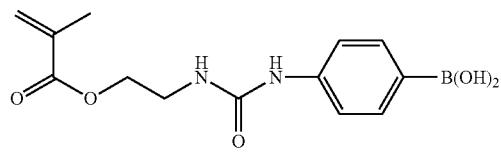
II-9
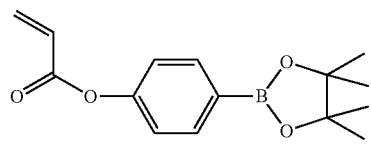

-continued

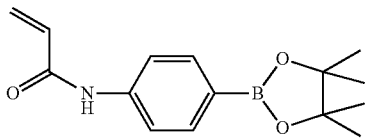
II-10

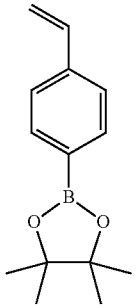
II-11

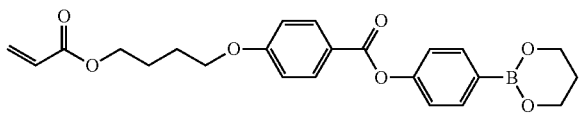
II-12

In the present invention, the content of the repeating unit represented by Formula (II) is preferably 3% to 80% by mass, more preferably 4% to 70% by mass, and even more preferably 5% to 50% by mass with respect to all repeating units.

<III Part>

It is preferable that the polymer compound of the present invention has a repeating unit (III part) represented by Formula (III) for the reason that the adhesiveness of an optically anisotropic layer to be formed with a polarizer is further improved.

Here, it is considered that the reason why the adhesiveness of an optically anisotropic layer to be formed with a polarizer is further improved is that, by the copolymer having the III part, the copolymer is unevenly distributed on the air interface side of the optically anisotropic layer to be formed (the surface side bonded with the polarizer) and thus the II part of the copolymer easily interacts with the surface of the polarizer.

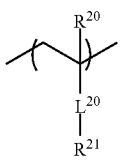
(III)

In Formula (III), $R^{2A}$ represents a hydrogen atom or an alkyl group having 1 to 20 carbon atoms. Of these, a hydrogen atom or an alkyl group having 1 to 10 carbon atoms is preferable, a hydrogen atom or an alkyl group having 1 to 4 carbon atoms is more preferable, a hydrogen atom or a methyl group is even more preferable.

In addition, in Formula (III), $L^{20}$ represents a divalent linking group selected from the group consisting of —O—, —COO—, —OCO—, a divalent aliphatic group, and a combination thereof. It is noted that —COO— represents that carbon to which $R^{20}$ is bonded and C=O are bonded and $R^{21}$ and O are bonded, and —OCO— represents that carbon to which $R^{20}$ is bonded and O are bonded and $R^{21}$ and C=O are bonded.

Examples of the divalent aliphatic group represented by $L^{20}$ include a divalent aliphatic chain group or a divalent aliphatic cyclic group. The divalent aliphatic chain group is preferably an alkylene group having 1 to 20 carbon atoms, and more preferably an alkylene group having 1 to 10 carbon atoms. The divalent aliphatic cyclic group is preferably a cycloalkylene group having 3 to 20 carbon atoms and more preferably a cycloalkylene group having 3 to 15 carbon atoms.

Among these, $L^{20}$ is preferably —COO— or —OCO—, and more preferably —COO—.

In addition, in Formula (III), $R^{21}$ represents an alkyl group having 4 to 20 carbon atoms, an alkyl group having 1 to 20 carbon atoms in which at least one hydrogen atom is substituted with a fluorine atom (hereinafter, also referred to as a "fluoroalkyl group"), or a monovalent organic group including —Si($R^{a3}$)($R^{a4}$)O—, and $R^{a3}$ and $R^{a4}$ each independently represent an alkyl group, a haloalkyl group, or an aryl group.

In the present invention, for the reason that the adhesiveness of an optically anisotropic layer to be formed with a polarizer is further improved, $R^{21}$ in Formula (III) is preferably a fluoroalkyl group having 1 to 20 carbon atoms, more preferably a fluoroalkyl group having 1 to 18 carbon atoms, and even more preferably a fluoroalkyl group having 2 to 15 carbon atoms.

In addition, the number of fluorine atoms is preferably 1 to 25, more preferably 3 to 21, and most preferably 5 to 21.

In the present invention, from the viewpoint of adhesiveness of an optically anisotropic layer to be formed with a polarizer and radical polymerizability, the repeating unit represented by Formula (III) is preferably a repeating unit represented by Formula (IV).

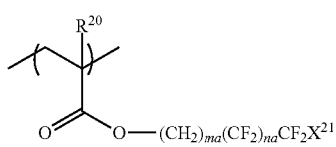

(IV)

In Formula (IV), $R^{20}$ represents a hydrogen atom or an alkyl group having 1 to 20 carbon atoms as $R^{20}$ in Formula (III) and the suitable embodiment is also the same.

In addition, in Formula (IV), ma and na each independently represent an integer of 0 to 19. Among these, from the viewpoint of adhesiveness improvement and ease of raw material availability, ma is preferably an integer of 1 to 8 and more preferably an integer of 1 to 5. Further, na is preferably an integer of 1 to 15, more preferably an integer of 1 to 12, even more preferably an integer of 2 to 10, and most preferably an integer of 5 to 7. Here, ma and na represent an integer of 0 to 19 in total.

In addition, in Formula (IV), $X^{21}$ represents a hydrogen atom or a fluorine atom and is preferably a fluorine atom.

Specific examples of a monomer forming the repeating unit represented by Formula (III) or (IV) include 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, 2-(perfluoro-3-methylbutyl)ethyl (meth)acrylate, 2-(perfluoro-5-methylhexyl)ethyl (meth)acrylate, 2-(perfluoro-7-methyloctyl)ethyl (meth)acrylate, 1H,1H,3H-tetrafluoropropyl (meth)acrylate, 1H,1H,5H-octafluoropentyl (meth)acrylate, 1H,1H,7H-dodecafluoroheptyl (meth)acrylate, 1H,1H,9H-hexadecafluorononyl (meth)acrylate, 1H-1-(trifluoromethyl)trifluoroethyl (meth)acrylate, 1H,1H,3H-hexafluorobutyl (meth)acrylate, 3-perfluorobutyl-2-hydroxypropyl (meth)acrylate, 3-perfluorohexyl-2-hydroxypropyl (meth)acrylate, 3-perfluorooctyl-2-hydroxypropyl (meth)acrylate, 3-(perfluoro-3-methylbutyl)-2-hydroxypropyl (meth)acrylate, 3-(perfluoro-5-methylhexyl)-2-hydroxypropyl (meth)acrylate, and 3-(perfluoro-7-methyloctyl)-2-hydroxypropyl (meth)acrylate.

On the other hand, it is more preferable that the monovalent organic group containing —Si($R^{a3}$)($R^{a4}$)O— represented by $R^{21}$ in Formula (III) is an organic group derived from a siloxane bond and has a structure obtained by polymerizing a compound represented by Formula (VII).

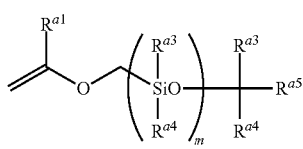

(VII)

In Formula (VII), $R^{a1}$ a hydrogen atom or an alkyl group having 1 to 20 carbon atoms, and $R^{a5}$ represents an alkyl group having 1 to 12 carbon atoms and more preferably represents an alkyl group having 1 to 4 carbon atoms.

In Formula (VII), $R^{a3}$ and $R^{a4}$ each independently represent an alkyl group, a haloalkyl group, or an aryl group.

As the alkyl group, an alkyl group having 1 to 10 carbon atoms is preferable. Examples thereof include a methyl group, an ethyl group, and a hexyl group.

As the haloalkyl group, a fluorinated alkyl group having 1 to 10 carbon atoms is preferable. Examples thereof include a trifluoromethyl group, and a pentafluoroethyl group.

As the aryl group, an aryl group having 6 to 20 carbon atoms is preferable. Examples thereof include a phenyl group, and a naphthyl group.

Among these, $R^{a3}$ and $R^{a4}$ preferably represent a methyl group, a trifluoromethyl group, or a phenyl group and particularly preferably represent a methyl group.

In Formula (VII), in represents an integer of 10 to 1000, preferably represents an integer of 20 to 500, and even more preferably represents an integer of 30 to 200.

As the compound represented by Formula (VII), a polysiloxane macromonomer containing a (meth)acryloyl group at one terminal (for example, SILAPLANE 0721, and SILAPLANE 0725 (all trade names, manufactured by JNC Corporation), AK-5, AK-30, and AK-32 (all trade names, manufactured by Toagosei Co., Ltd.), KF-100T, X-22-169AS, KF-102, X-22-37011E, X-22-164B, X-22-164C, X-22-5002, X-22-173B, X-22-174D, X-22-167B, and X-22-161AS (all trade names, manufactured by Shin-Etsu Chemical Co., Ltd.)) may be exemplified.

In the present invention, in a case where the repeating unit represented by Formula (III) is included, the content thereof is preferably 2% to 80% by mass, more preferably 5% to 70% by mass, and even more preferably 10% to 60% by mass with respect to all repeating units.

In addition, in the present invention, for the reason that the adhesiveness of an optically anisotropic layer to be formed with a polarizer is further improved, in a case where the repeating unit represented by Formula (III) is included, it is preferable that the content of the repeating unit represented by Formula (I) is 10% to 50% by mass with respect to all repeating units, the content of the repeating unit represented by Formula (II) is 5% to 50% by mass with respect to all repeating units, and the content of the repeating unit represented by Formula (III) is 10% to 60% by mass with respect to all repeating units.

<V Part>

It is preferable that the polymer compound of the present invention has a repeating unit (V part) represented by Formula (V) for the reason that the alignment properties of a liquid crystal compound described later are further improved.

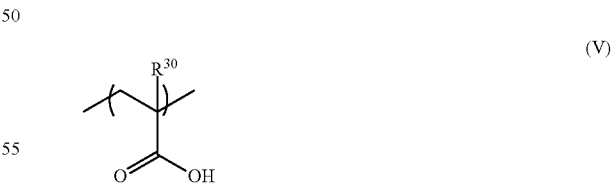

(V)

In Formula (V), $R^{30}$ represents a hydrogen atom or an alkyl group having 1 to 20 carbon atoms. Of these, a hydrogen atom or an alkyl group having 1 to 10 carbon atoms is preferable, a hydrogen atom or an alkyl group having 1 to 4 carbon atoms is more preferable, a hydrogen atom or a methyl group is even more preferable.

Specific examples of the monomer forming the repeating unit represented by Formula (V) include acrylic acid, and methacrylic acid.

In the present invention, in a case where the repeating unit represented by Formula (V) is included, the content thereof is preferably 1% to 60% by mass, more preferably 2% to 40% by mass, and even more preferably 4% to 20% by mass with respect to all repeating units.

<Other Parts>

The polymer compound of the present invention may have repeating units other than the repeating units represented by Formulae (I), (II), (III), and (V), if necessary.

As monomers forming other repeating units, monomers described in Polymer Handbook 2nd ed., J. Brandrup, Wiley Interscience (1975) Chapter 2, Pages 1 to 483 can be used.

For example, compounds having one addition polymerizable unsaturated bond selected from acrylic acid esters, methacrylic acid esters, acrylamides, methacrylamides, allyl compounds, vinyl ethers, vinyl esters, and the like can be used.

Specific examples of monomers include the following monomers.

(Acrylic Acid Esters)

Specific examples of acrylic acid esters include methyl acrylate, ethyl acrylate, propyl acrylate, chloroethyl acrylate, 2-hydroxyethyl acrylate, trimethylolpropane monoacrylate, benzyl acrylate, methoxybenzyl acrylate, phenoxyethyl acrylate, furfuryl acrylate, and tetrahydrofurfuryl acrylate.

(Methacrylic Acid Esters)

Specific examples of methacrylic acid esters include methyl methacrylate, ethyl methacrylate, propyl methacrylate, chloroethyl methacrylate, 2-hydroxyethyl methacrylate, trimethylolpropane monomethacrylate, benzyl methacrylate, methoxybenzyl methacrylate, phenoxyethyl methacrylate, furfuryl methacrylate, tetrahydrofurfuryl methacrylate, and ethylene glycol monoacetoacetate monomethacrylate.

(Acrylamides)

Specific examples of acrylamides include acrylamide, N-alkyl acrylamide (as the alkyl group, an alkyl group having 1 to 3 carbon atoms, for example, a methyl group, an ethyl group, or a propyl group), N,N-dialkyl acrylamide (as the alkyl group, an alkyl group having 1 to 6 carbon atoms)N-hydroxyethyl-N-methylacrylamide, and N-2-acetamidoethyl-N-acetylacrylamide.

(Methacrylamides)

Specific examples of methacrylamides include methacrylamide, N-alkyl methacrylamide (as the alkyl group, an alkyl group having 1 to 3 carbon atoms, for example, a methyl group, an ethyl group, or a propyl group), N, N-dialkyl methacrylamide (as the alkyl group, an alkyl group having 1 to 6 carbon atoms), N-hydroxyethyl-N-methylmethacrylamide, and N-2-acetamidoethyl-N-acetyl methacrylamide.

(Allyl Compounds)

Specific examples of allyl compounds include allyl esters (for example, allyl acetate, allyl caproate, allyl caprylate, allyl laurate, allyl palmitate, allyl stearate, allyl benzoate, allyl acetoacetate, and allyl lactate), and allyloxyethanol.

(Vinyl Ethers)

Specific examples of vinyl ethers include alkyl vinyl ether (for example, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, and tetrahydro furfuryl vinyl ether.

(Vinyl Esters)

Specific examples of vinyl esters include vinyl acetate, vinyl butyrate, vinyl isobutyrate, vinyl trimethylacetate, vinyl diethylacetate, vinyl valerate, vinyl caproate, vinyl chloroacetate, vinyl dichloroacetate, vinyl methoxyacetate, vinyl butoxyacetate, vinyl lactate, vinyl-β-phenylbutyrate, and vinyl cyclohexylcarboxylate.

(Dialkyl Itaconates)

Examples of dialkyl itaconates include dimethyl itaconate, diethyl itaconate, and dibutyl itaconate.

(Others)

Examples of other monomers include dialkyl esters or monoalkyl esters of fumaric acid, dibutyl fumarate, crotonic acid, itaconic acid, acrylonitrile, methacrylonitrile, malconitrile, styrene, styrene macromer (AS-6S manufactured by Toagosei Co., Ltd.), and methyl methacrylate macromer (AA-6, manufactured by Toagosei Co., Ltd.).

In the present invention, in a case where other repeating units are included, the content thereof is preferably 1% to 50% by mass, more preferably 1% to 30% by mass, and even more preferably 1% to 20% by mass with respect to all repeating units.

The weight-average molecular weight (Mw) of the polymer compound of the present invention is preferably 1000 to 200000, more preferably 1500 to 100000, and even more preferably 3000 to 60000.

The number average molecular weight (Mn) of the polymer compound of the present invention is preferably 500 to 40000, more preferably 600 to 35000, and even more preferably 600 to 30000.

The distribution (Mw/Mn) of the polymer compound of the present invention is preferably 1.00 to 12.00, more preferably 1.00 to 11.00, and even more preferably 1.00 to 10.00.

The weight-average molecular weight and the number average molecular weight are values measured by gel permeation chromatography (GPC) under the following conditions.

<Measurement Conditions>

[Eluent] N-methyl-2-pyrrolidone (NMP)

[Apparatus name] EcoSEC HLC-8320GPC (manufactured by Tosoh Corporation)

[Column] TSKgel Super AWM-H (manufactured by Tosoh Corporation)

[Column temperature] 40° C.

[Flow rate] 0.50 ml/min

Specific examples of the polymer compound of the present invention having each repeating unit described above include compounds represented by Formulae (A-1) to (A-22).

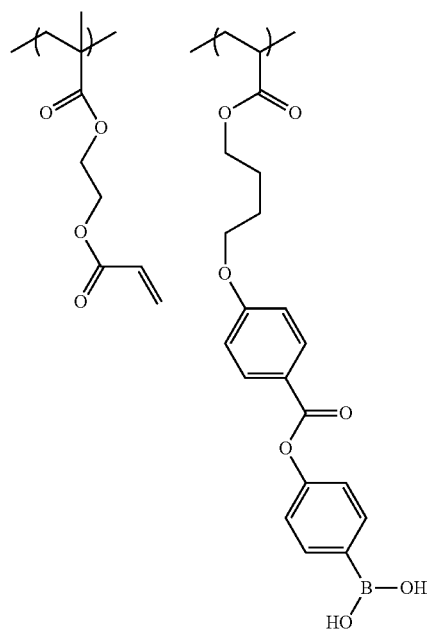
(A-1)
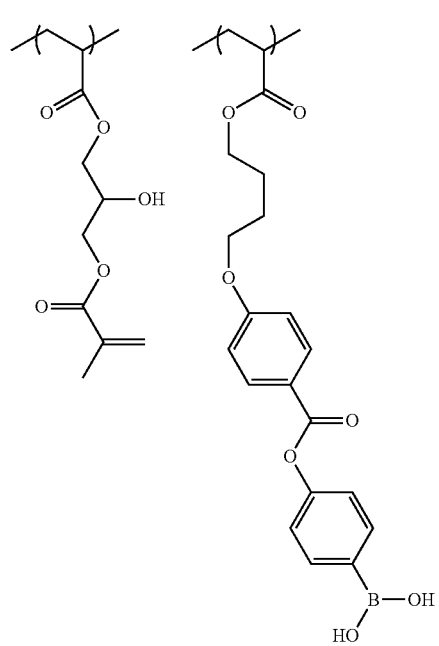
(A-2)
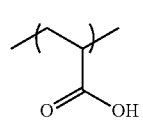
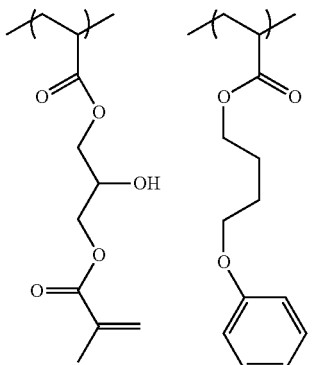
(A-3)
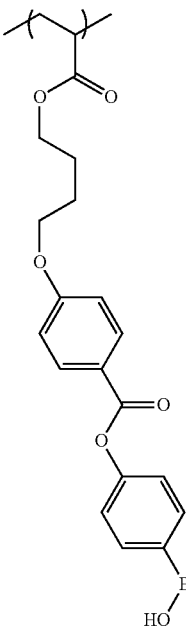
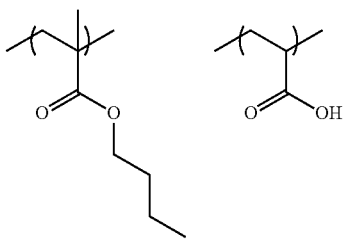
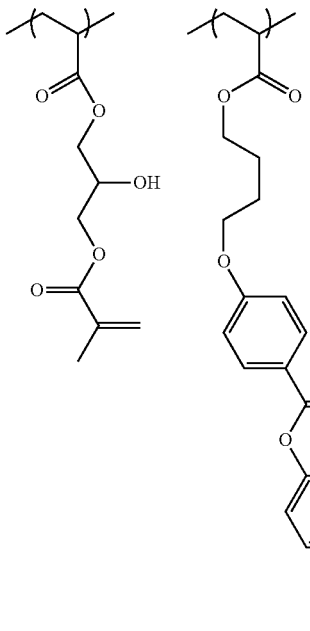
(A-4)
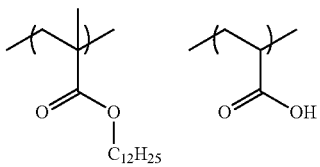

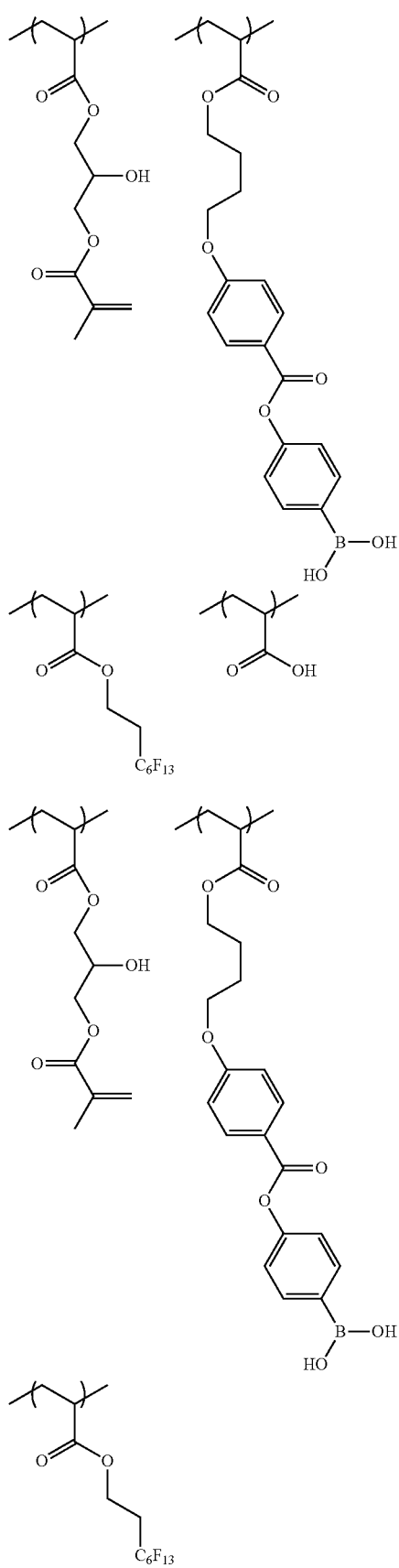
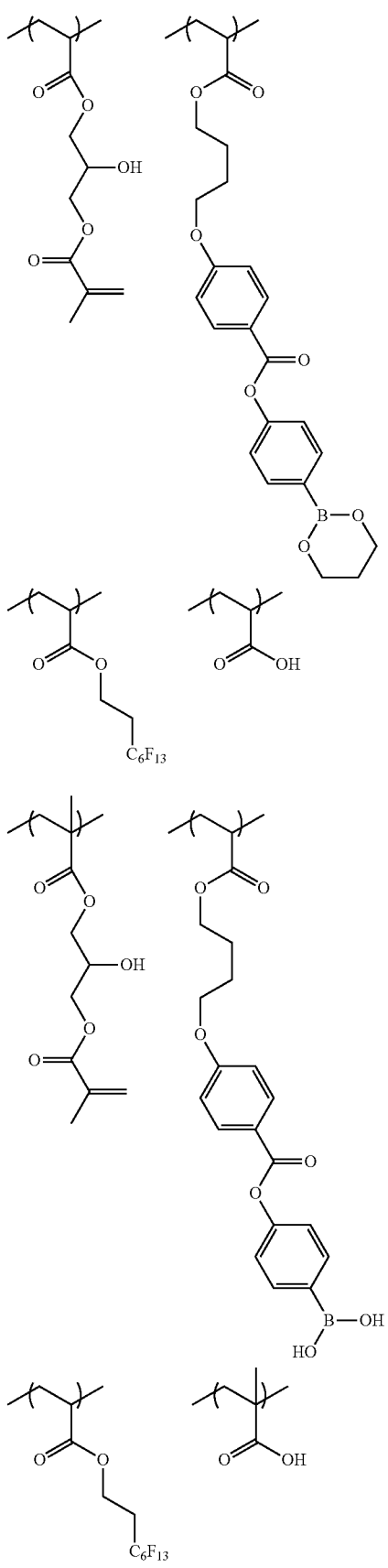

(A-9)
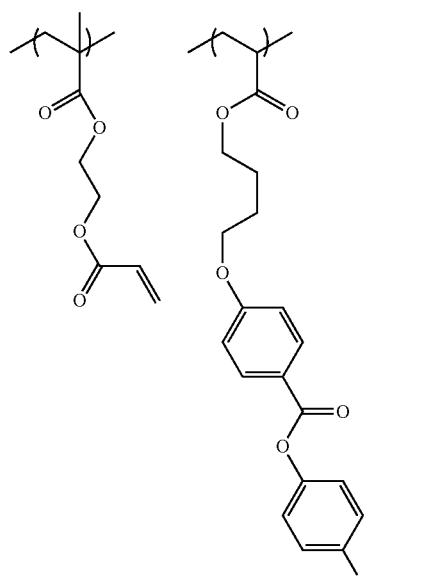
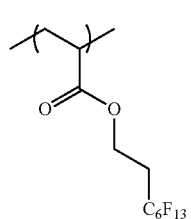
(A-10)
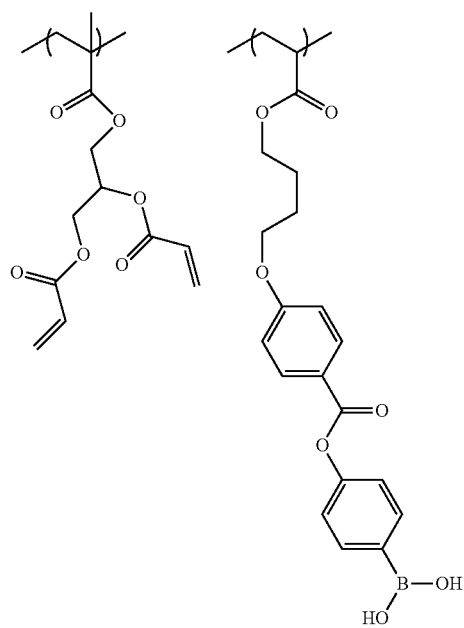
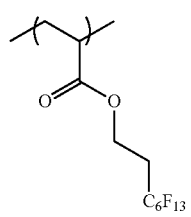
(A-11)
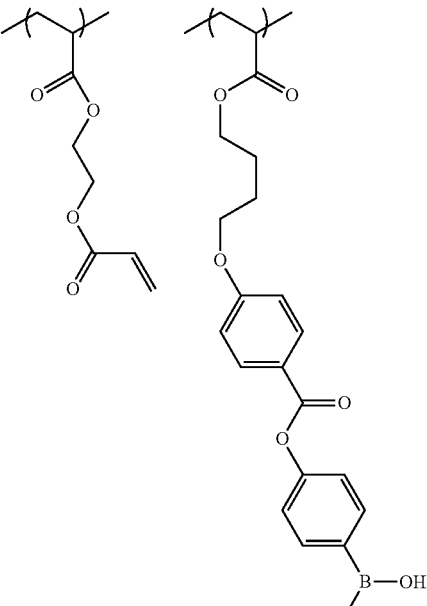
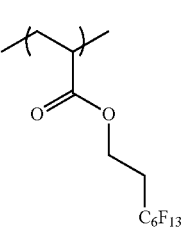
(A-12)
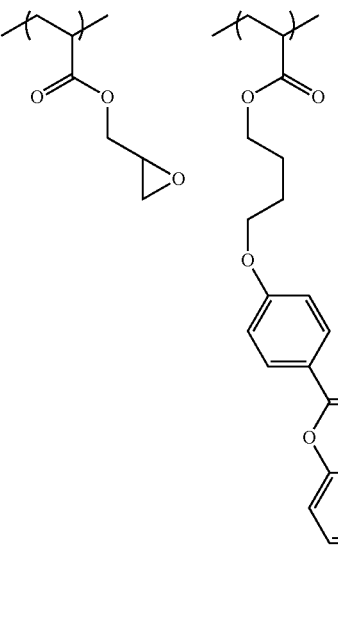
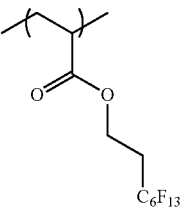

(A-13)
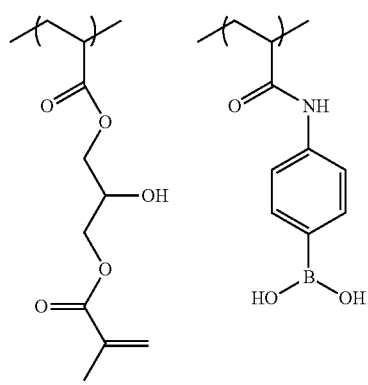
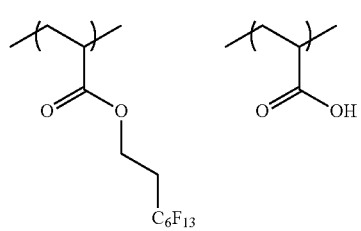
(A-14)
(A-15)
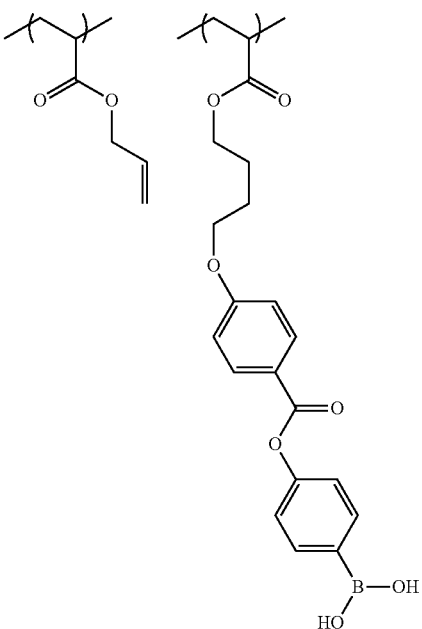
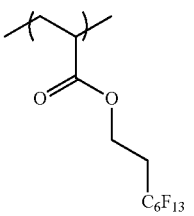
(A-16)
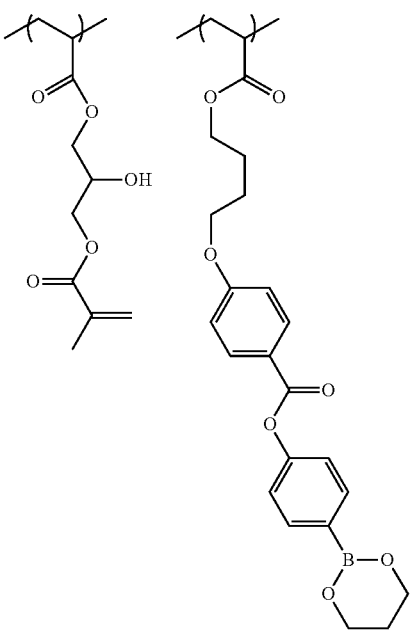
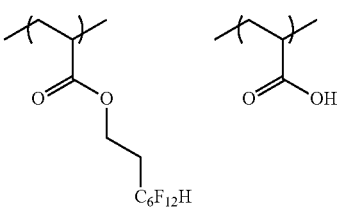

(A-17) 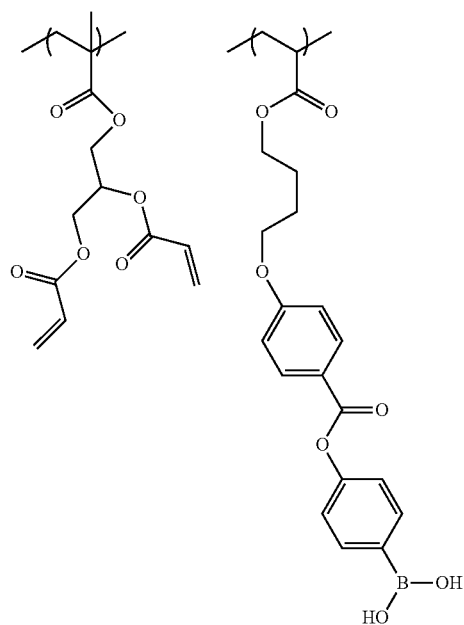 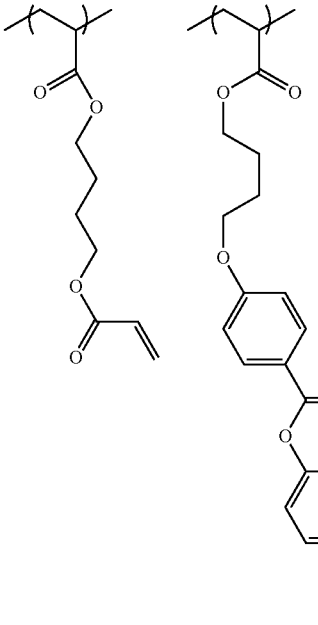
(A-19)
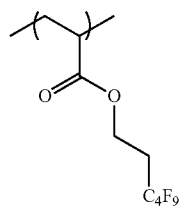 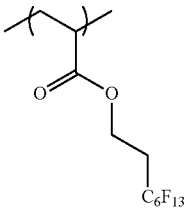
(A-18) 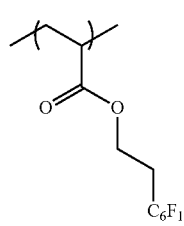 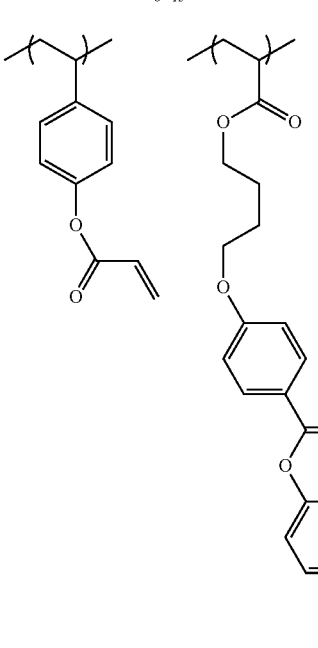
(A-20)
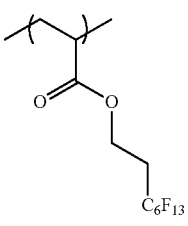

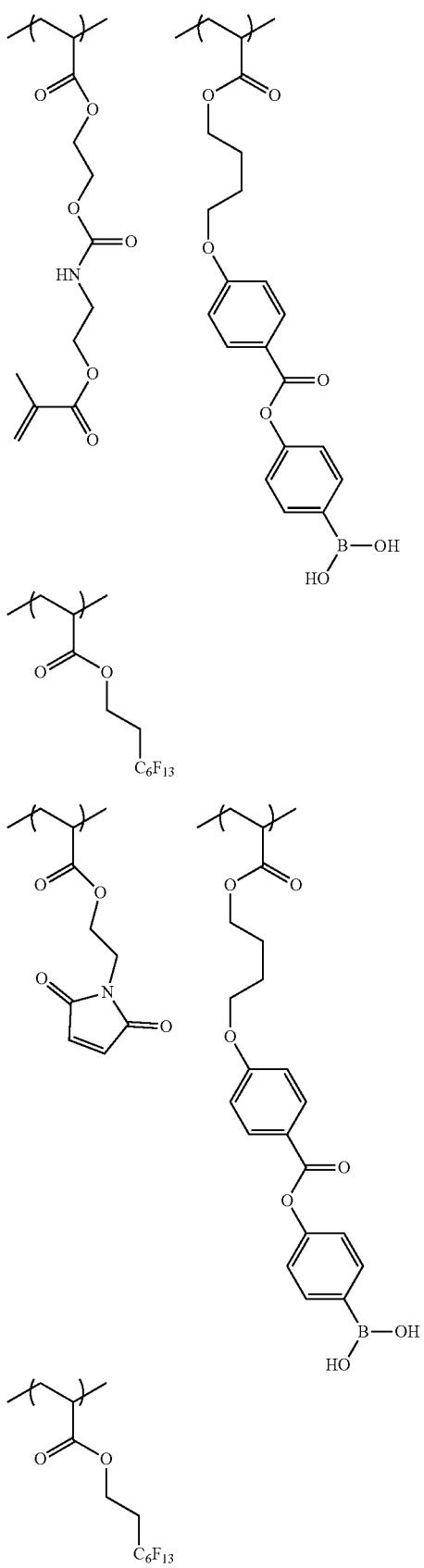

The content of the polymer compound of the present invention is preferably 0.0001% to 40% by mass, more preferably 0.001% to 20% by mass, and even more preferably 0.1% to 5% by mass in a case where the total solid content (all components excluding the solvent) of the liquid crystal composition according to the embodiment of the present invention is 100% by mass.

[Liquid Crystal Compound]

Liquid crystal compounds can be classified into a rod-like type and a disk-like type according to the shape thereof. Further, each includes low-molecular types and polymer types. The polymer generally refers to a type having a polymerization degree of 100 or more (Polymer Physics-Phase Transition Dynamics, by Masao Doi, p. 2, published by Lwanami Shoten, Publishers, 1992).

In the present invention, any type of liquid crystal compound can be used, but it is preferable to use a rod-like liquid crystal compound or a disk-like liquid crystal compound (hereinafter, also referred to as a "discotic liquid crystal compound") having a polymerizable group.

Here, examples of the polymerizable group include a (meth)acryloyl group, a styryl group, a vinyl ketone group, a butadiene group, a vinyl ether group, an oxiranyl group, an aziridinyl group, and an oxetane group. Among these, a (meth)acryloyl group or styryl group is preferable and a (meth)acryloyl group is more preferable.

Examples of the rod-like liquid crystal compound include rod-like liquid crystal compounds described in paragraphs [0045] to [0066] of JP2009-217256A, and the content thereof is incorporated in the present specification.

Examples of the discotic liquid crystal compound include discotic liquid crystal compounds described in paragraphs [0025] to [0153] of JP2006-301614A, paragraphs [0020] to [0122] of JP2007-108732A, and paragraphs [0012] to [0108] of JP2010-244038A, and the contents thereof are incorporated in the present specification.

The liquid crystal compound used in the present invention is preferably immobilized in a vertically aligned state to adjust the optical properties of an optically anisotropic layer.

For example, a layer in which the rod-like liquid crystal compound is immobilized in a vertically aligned state can function as a positive C-plate. In addition, a layer in which the discotic liquid crystal compound is immobilized in a vertically aligned state can function as a negative A-plate.

In the present invention, the vertical alignment is an alignment state in which in a case of a rod-like liquid crystal compound, the normal direction of the layer and the major axis direction of the liquid crystal molecules are parallel to each other, and in a case of a discotic liquid crystal compound, the normal direction of the layer and the disc planes of the liquid crystal molecules are parallel to each other.

In addition, it is particularly preferable that the major axis direction of the liquid crystal molecules and the disc planes of the liquid crystal molecules are parallel to the normal direction of the layer, but an inclination is generated due to the alignment state of the liquid crystal molecules in some cases. The inclination is preferably within 3.5°.

[Boron Compound]

It is preferable that in a case where an optically anisotropic layer is formed using a support, for the reason that adhesiveness with the support is improved, the liquid crystal composition according to the embodiment of the present invention further contains a compound (hereinafter, also referred to as a "boron compound") represented by Formula (VI) at a content of 0.5% to 7.0% by mass with respect to the liquid crystal compound.

In Formula (VI), Z represents a substituent having a polymerizable group, n represents an integer of 0 to 4, and in a case where n is 2 or greater, two or more Z's may be the same or different from each other. Q represents a substituent containing at least one boron atom, m represents 1 or 2, and in a case where m is 2, two Q's may be the same or different from each other. $L^{100}$ represents a linking group having a valency of n+m. However, in a case where n is 0 and m is 1, $L^{100}$ represents a hydrogen atom, a substituted or unsubstituted alkyl group, a substituted or unsubstituted alkenyl group, a substituted or unsubstituted alkynyl group, a substituted or unsubstituted aryl group, or a substituted or unsubstituted heteroaryl group.

Examples of the substituent having a polymerizable group represented by Z in Formula (VI) include substituents including a (meth)acryloyl group, a styryl group, a vinyl ketone group, a butadiene group, a vinyl ether group, an oxiranyl group, an aziridinyl group, and an oxetane group.

Among these, a substituent including a (meth)acryloyl group, a styryl group, an oxiranyl group, or an oxetane group is preferable, and a substituent including a (meth)acrylate group or a styryl group is more preferable.

Particularly, the substituent including a (meth)acryloyl group is preferably a group having an ethylenically unsaturated double bond represented by Formula (A).

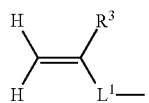

In Formula (A), $R^3$ represents a hydrogen atom or a methyl group and a hydrogen atom is preferable.

In addition, $L^1$ represents a single bond or a divalent linking group selected from the group consisting of —O—, —CO—, —NH—, —CO—NH—, —COO—, —O—COO—, an alkylene group, an arylene group, a heterocyclic group, and a combination thereof. Among these, a single bond, —CO—NH—, or —COO— is preferable, and a single bond or —CO—NH— is particularly preferable.

In addition, in Formula (VI), $L^{100}$ represents a linking group having a valency of n+m. However, in a case where n is 0 and m is 1, $L^{100}$ represents a hydrogen atom, a substituted or unsubstituted alkyl group, a substituted or unsubstituted alkenyl group, a substituted or unsubstituted alkynyl group, a substituted or unsubstituted aryl group, or a substituted or unsubstituted heteroaryl group.

n represents an integer of 0 to 4, preferably represents 0 or 1, and more preferably represents 1. m represents 1 or 2 and preferably represents 1.

In addition, $L^{100}$ may be, for example, a single bond, or a divalent linking group selected from the group consisting of —O—, —CO—, —NH—, —CO—NH—, —COO—, —O—COO—, an alkylene group, an arylene group, a heteroaryl group, and a combination thereof.

Among these, $L^{100}$ is more preferably a substituted or unsubstituted arylene group.

In addition, the alkyl group, the alkenyl group, the alkynyl group, the aryl group, and the heteroaryl group represented by $L^{100}$ have the same as those represented by $R^1$ and $R^2$ in Formula (B), and the preferable ranges thereof are the same. Examples of substituents of these groups include at least one selected from the above-described substituent group Y.

In Formula (VI), Q is a substituent containing at least one boron atom, and is preferably a group that can be adsorbed and bonded to a support (for example, a polymer film).

For example, in a case where the polymer film has a hydroxyl group or a carboxyl group on its surface by a surface treatment or the like, a group that can be bonded with a hydroxyl group or a carboxyl group of the polymer film is preferable. The expression "group that can be adsorbed and bonded to a polymer film" means a group that can be chemically adsorbed to the polymer film by interaction with a structure of a material constituting the polymer film.

Examples of the substituent containing at least one boron atom include a substituent represented by Formula (B).

In Formula (B), $R^1$ and $R^2$ each independently represent a hydrogen atom, a substituted or unsubstituted aliphatic hydrocarbon group, a substituted or unsubstituted aryl group, or a substituted or unsubstituted heteroaryl group, $R^1$ and $R^2$ may be linked to each other through an alkylene linking group, an arylene linking group, or a linking group of a combination thereof.

Examples of the substituted or unsubstituted aliphatic hydrocarbon group represented by $R^1$ and $R^2$ include an alkyl group, an alkenyl group, or an alkynyl group, which may have a substituent.

Specific examples of the alkyl group include linear, branched, or cyclic alkyl groups such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, a 2-methylhexyl group, a cyclopentyl group, a cyclohexyl group, a 1-adamantyl group, and a 2-norbornyl group.

Specific examples of the alkenyl group include linear, branched, or cyclic alkenyl groups such as a vinyl group, a 1-propenyl group, a 1-butenyl group, a 1-methyl-1-propenyl group, a 1-cyclopentenyl group, and a 1-cyclohexenyl group.

Specific examples of the alkynyl group include an ethynyl group, a 1-propynyl group, a 1-butynyl group, and a 1-octynyl group.

Examples of the substituted or unsubstituted aryl group represented by $R^1$ and $R^2$ include one in which 1 to 4 benzene rings form a fused ring, and one in which a benzene ring and an unsaturated five-membered ring form a fused ring, and specific examples thereof include a phenyl group, a naphthyl group, an anthryl group, a phenanthryl group, an indenyl group, an acenaphthenyl group, a fluorenyl group, and a pyrenyl group.

Examples of the substituted or unsubstituted heteroaryl group represented by $R^1$ and $R^2$ include one in which one hydrogen atom on a heteroaromatic ring containing one or more hetero atoms selected from the group consisting of a nitrogen atom, an oxygen atom and a sulfur atom is eliminated to form a heteroaryl group.

Specific examples of the heteroaromatic ring containing one or more hetero atoms selected from the group consisting of a nitrogen atom, an oxygen atom and a sulfur atom include pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazole benzimidazole, anthranil, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, and pteridine.

As the substituent which $R^1$, $R^2$, and $L^{1W}$ may have, a monovalent nonmetallic atomic group excluding hydrogen can be exemplified and for example, the substituent is selected from the above-described substituent group Y.

In addition, $R^1$ and $R^2$ in Formula (B) preferably represent a hydrogen atom.

The molecular weight of the compound represented by Formula (VI) is preferably 120 to 1200 and more preferably 180 to 800.

Specific examples of the compound represented by Formula (VI) include compounds described in paragraphs [0035] to [0040] of JP2007-219193A, and the content thereof is incorporated in the present specification.

Other specific examples of the compound represented by Formula (VI) include those represented by the following formulae.

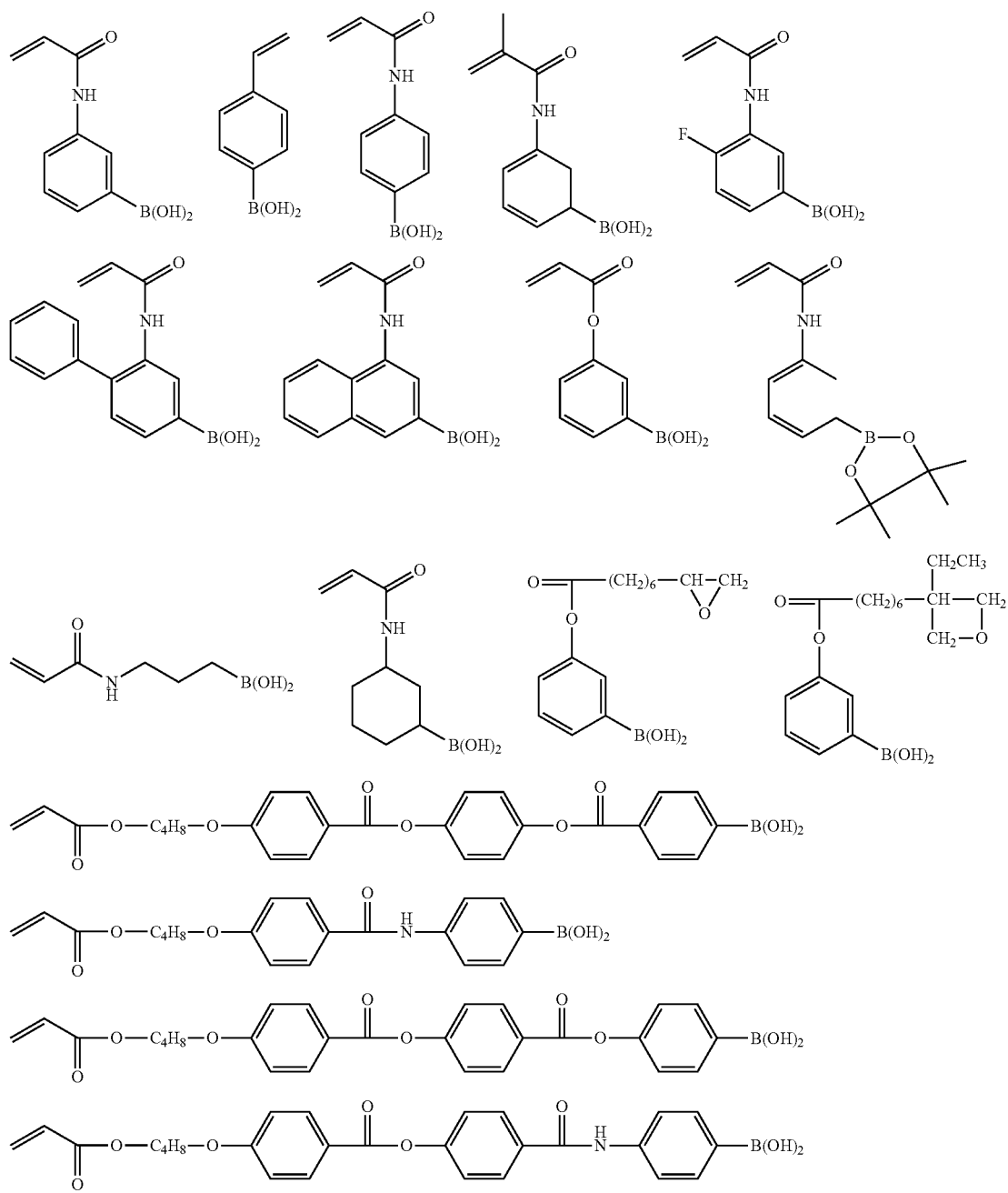

-continued

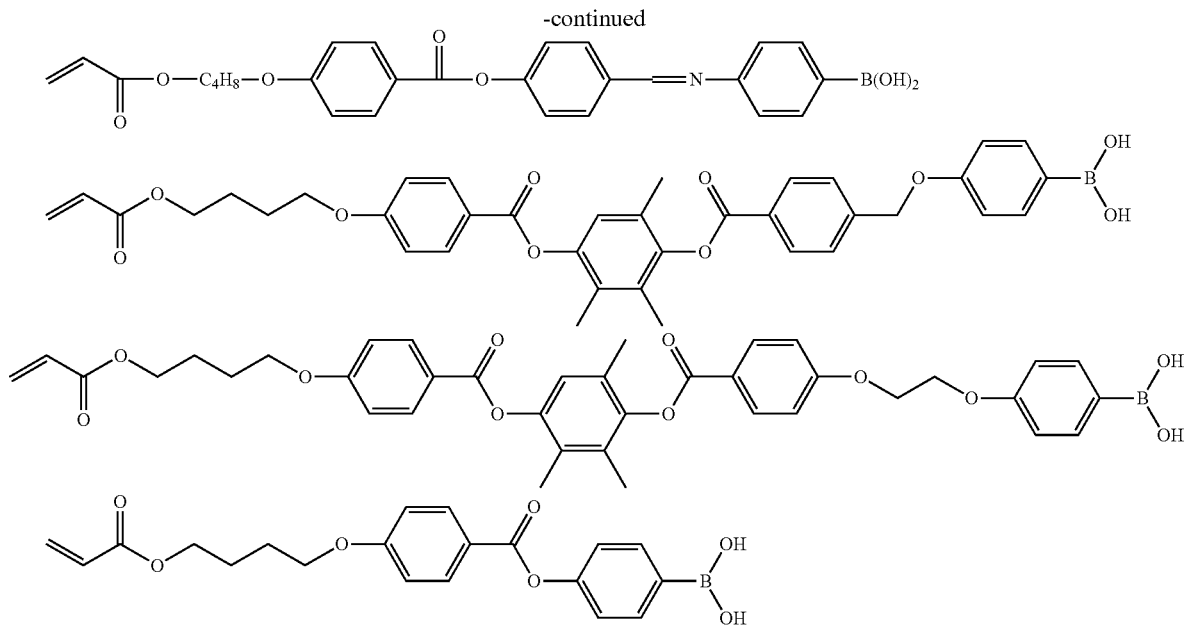

In the present invention, in a case where the boron compound represented by Formula (VI) is included, the content thereof is preferably 0.5% to 7.0% by mass, more preferably 1% to 6% by mass, and even more preferably 1% to 5% by mass with respect to the above-described liquid crystal compound.

When a plurality of liquid crystal compounds are included, the content is the ratio to the total mass thereof.

[Polymerization Initiator]

It is preferable that the liquid crystal composition according to the embodiment of the present invention includes a polymerization initiator.

The polymerization initiator is preferably a photopolymerization initiator.

Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes, and coumarins. Specific examples, preferred aspects, commercially available products and the like of the photopolymerization initiator are described in paragraphs [0133] to [0151] of JP2009-098658A, and these may be suitably used likewise in the present invention.

Various examples of the photopolymerization initiator are described also in "Latest UV Curing Technology" {Technical Information Institute Co., Ltd.} (1991), p. 159 and "Ultraviolet Ray Curing System" written by Kiyomi Kato (1989, published by United Engineering Center), pp. 65-148, and these are useful for the present invention.

Preferable examples of commercially available photoradical polymerization initiators of photocleavage type include "IRGACURE 651", "IRGACURE 184", "IRGACURE 819", "IRGACURE 907", "IRGACURE 1870" (a mixed initiator of CGI-403/IRGACURE 184=7/3), "IRGACURE 500", "IRGACURE 369", "IRGACURE 1173", "IRGACURE 2959", "IRGACURE 4265", "IRGACURE 4263", "IRGACURE 127", "OXE01", and the like, manufactured by BASF (former Ciba Specialty Chemicals Inc.); "KAYACURE DETX-S", "KAYACURE BP-100", "KAYACURE BDMK", "KAYACURE CTX", "KAYACURE BMS", "KAYACURE 2-EAQ", "KAYACURE ABQ", "KAYACURE CPTX", "KAYACURE EPD", "KAYACURE ITX", "KAYACURE QTX", "KAYACURE BTC", "KAYACURE MCA", and the like, manufactured by Nippon Kayaku Co., Ltd.; "ESACURE (KIP100F, KBI, EB3, BP, X33, KT046, KT37, KIPI50, and TZT)", and the like, manufactured by Sartomer Company Inc.; and a combination thereof.

[Solvent]

The liquid crystal composition according to the embodiment of the present invention can contain a solvent from the viewpoint of workability of an optically anisotropic layer to be formed.

The solvent may be appropriately selected from the viewpoint of being capable of dissolving or dispersing the copolymer, the liquid crystal compound, and the like, easily forming a uniform surface state in a coating step and a drying step, securing liquid preservability, having a suitable saturated vapor pressure, and the like.

Examples of such a solvent include dibutyl ether, dimethoxyethane, diethoxyethane, propylene oxide, 1,4-dioxane, 1,3-dioxolane, 1,3,5-trioxane, tetrahydrofuran, anisole, phenetole, dimethyl carbonate, methyl ethyl carbonate, diethyl carbonate, acetone, methyl ethyl ketone (MEK), diethyl ketone, dipropyl ketone, diisobutyl ketone, cyclopentanone, cyclohexanone, methylcyclohexanone, ethyl formate, propyl formate, pentyl formate, methyl acetate, ethyl acetate, propyl acetate, methyl propionate, ethyl propionate, γ-butyrolactone, methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetylacetone, diacetone alcohol, methyl acetoacetate, ethyl acetoacetate, methyl alcohol, ethyl alcohol, isopropyl alcohol, n-butyl alcohol, cyclohexyl alcohol, isobutyl acetate, methyl isobutyl ketone (MIBK), 2-octanone, 2-heptanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohcxane, methylcyclohexane, ethylcyclohexane, benzene, toluene, and xylene. One of these solvents may be used alone, or two or more thereof may be used in combination.

Among the solvents, it is preferable to use at least one of methyl acetate, ethyl acetate, methyl ethyl ketone, acetone, methyl alcohol, or ethyl alcohol.

In the present invention, in a case where the solvent is used, the content thereof is set such that the concentration of the solid content of the liquid crystal composition is preferably in a range of 5% to 80% by mass, more preferably in a range of 10% to 75% by mass, and even more preferably in a range of 15% to 70% by mass.

[Optical Film]

An optical film according to an embodiment of the present invention is an optical film having an optically anisotropic layer obtained by polymerizing the above-described liquid crystal composition according to the embodiment of the present invention.

In addition, the optical film according to the embodiment of the present invention may have an optically anisotropic layer on a support. In a state in which the optically anisotropic layer is laminated on the support, the optically anisotropic layer can be appropriately stretched together with the support to adjust optical properties and mechanical properties.

Further, the optical film according to the embodiment of the present invention may have a single optically anisotropic layer or a structure in which two or more optically anisotropic layers are laminated, and may have functional layers other than the optically anisotropic layer.

[Support]

Examples of the support include a glass substrate and a polymer film. Examples of the material of the polymer film include a cellulose-based polymer, a cycloolefin-based polymer, a polyester-based polymer, an olefin-based polymer, a (meth)acrylic polymer, and a polyamide-based polymer.

Among these, it is preferable to use a polymer film using a cellulose-based polymer, particularly, a cellulose acylate-based polymer (cellulose acylate-based film), or a polymer film using cycloolefin-based polymer (cycloolefin-based film) as a support.

In the present invention, the thickness of the support is not particularly limited, but in consideration of mechanical strength and a case of storing the optical film according to the embodiment of the present invention in a long roll form, the thickness is preferably 5 to 100 μm, more preferably 10 to 75 μm, and even more preferably 15 to 55 μm.

In the present invention, a surface treatment can be appropriately performed for the purpose of adjusting the surface properties of the support. For lowering the surface energy, for example, a corona treatment, a room temperature plasma treatment, a saponification treatment, and the like can be performed, and for raising the surface energy, a silicone treatment, a fluorine treatment, an olefin treatment, and the like can be performed.

Further, in the present invention, in order to control the adhesiveness with the optically anisotropic layer, a releasing agent or the like may be applied to the surface of the support in advance. For example, the optically anisotropic layer may be used by laminating with a polarizer with an adhesive or a pressure sensitive adhesive in a post step and then peeling off only the support.

[Optically Anisotropic Layer]

The optically anisotropic layer of the optical film according to the embodiment of the present invention is an optically anisotropic layer obtained by polymerizing the above-described liquid crystal composition according to the embodiment of the present invention and can be formed by, for example, a method in which the above-described support is coated with the above-described liquid crystal composition according to the embodiment of the present invention, the liquid crystal composition is dried, and then the liquid crystal composition is polymerized (cured), a solution film forming method, and the like.

Specific examples of the coating method include known methods such as a dip coating method, an air knife coating method, a curtain coating method, a roller coating method, a wire bar coating method, a gravure coating method, a slide coating method, an extrusion coating method (die coating method) (refer to JP2003-164788A), and a microgravure coating method. Among these, a microgravure coating method and a die coating method are preferable.

Regarding the drying and curing methods, preferable examples thereof will described below.

In the present invention, it is effective to cure the liquid crystal composition by combining irradiation with ionizing radiation and a heat treatment before irradiation, simultaneously with irradiation or after irradiation.

Examples thereof include a method of performing irradiation with ionizing radiation after performing a heat treatment, a method of performing a heat treatment, irradiation with ionizing radiation, and a heat treatment in this order, and a method of performing irradiation with ionizing radiation and then performing a heat treatment.

In the present invention, as described above, it is preferable to perform a heat treatment in combination of irradiation with ionizing radiation. The heat treatment is not particularly limited as long as the functional film is not damaged, but the temperature is preferably 40° C. to 150° C. and more preferably 40° C. to 110° C.

The time required for the heat treatment varies depending on the molecular weight of components to be used, interaction with other components, viscosity, and the like, but the time required for the heat treatment is preferably 15 seconds to 1 hour, more preferably 20 seconds to 30 minutes, and most preferably 30 seconds to 5 minutes.

The kind of the ionizing radiation is not particularly limited. Examples thereof include an X-ray, an electron beam, an ultraviolet ray (UV ray), visible light, and an infrared ray, and an ultraviolet ray is widely used.

For example, in a case where the optically anisotropic layer includes an ultraviolet curable component, it is preferable to cure the functional film with an ultraviolet lamp at an irradiation dose of 10 mJ/cm$^2$ to 1000 mJ/cm$^2$. From the viewpoint of the adhesiveness between the adhesive layer and the optically anisotropic layer, the total irradiation dose is more preferably 50 mJ/cm$^2$ to 1000 mJ/cm$^2$.

On the other hand, in the solution film forming method, a solution is prepared by dissolving the above-described liquid crystal composition according to the embodiment of the present invention in an organic solvent or water, and the solution is uniformly cast on a support after appropriately performing a condensation step, a filtration step, and the like. Next, a half-dry film is peeled off from the support and the solvent is dried in a drying zone while appropriately gripping both ends of the web with clips or the like. The curing step by UV light irradiation or the like can also be used appropriately. In addition, stretching can be separately performed during the drying of the film or after completion of drying and curing of the film.

In the present invention, for the reason that the adhesiveness of the optically anisotropic layer with a polarizer is further improved, it is preferable that the polymer compound (copolymer) of the present invention included in the above-described liquid crystal composition according to the embodiment of the present invention is unevenly distributed on an air interface side of the optically anisotropic layer, that is, an opposite side of the interface with the support.

Here, the polymer compound of the present invention unevenly distributed on the air interface side refers to not the copolymer itself (unreacted product) having the repeating unit (I part) represented by Formula (I) and the repeating unit (II part) represented by Formula (II) but a compound after the polymerizable group contained in the I part undergoes reaction by polymerization.

In addition, the uneven distribution refers that the content of the polymer compound in a region from the surface of the optically anisotropic layer on the air interface side to a depth of 10% of the thickness of the optically anisotropic layer is larger than the total mass (average mass) of the polymer compound included in the optically anisotropic layer.

In addition, in the present invention, in a case where the liquid crystal composition according to the embodiment of the present invention contains the boron compound represented by Formula (VI), for the reason that the adhesiveness of the optically anisotropic layer with the support is improved, it is preferable that the boron compound is unevenly distributed on the support side of the optically anisotropic layer.

Here, the uneven distribution refers that than the content of the boron compound in a region from the interface of the optically anisotropic layer on the support side to a depth of 10% of the thickness of the optically anisotropic layer is larger than the total mass (average mass) of the boron compound included in the optically anisotropic layer.

In the present invention, the thickness of the optically anisotropic layer is not particularly limited but is preferably 0.1 to 30.0 μm, more preferably 0.2 to 5.0 μm, and even more preferably 0.4 to 2.0 μm.

It is preferable to set the thickness of the optically anisotropic layer to 0.1 μm or more since processing suitability and durability in a case of laminating the optically anisotropic layer on a polarizer can be secured, and it is preferable to set the thickness of the optically anisotropic layer to 30 μm or less since the thickness of a polarizing plate can be reduced.

[Polarizing Plate]

A polarizing plate according to an embodiment of the present invention is a polarizing plate having the above-described optical film according to the embodiment of the present invention, and a polarizer, in which the optically anisotropic layer included in the optical film and the polarizer are laminated through an adhesive layer.

[Polarizer]

The polarizer of the polarizing plate according to an embodiment of the present invention is not particularly limited as long as the polarizer is a member having a function of converting light into specific linearly polarized light, and a known absorptive type polarizer and a known reflective type polarizer in the related art can be used.

As the absorptive type polarizer, an iodine-based polarizer, a dye-based polarizer using a dichroic dye, a polyene-based polarizer, and the like can be used. As the iodine-based polarizer and the dye-based polarizer, there are a coating type polarizer and a stretching type polarizer, and any type of polarizer can be applied. However, a polarizer prepared by allowing polyvinyl alcohol to adsorb iodine or a dichroic dye and performing stretching is preferable.

In addition, examples of a method of obtaining a polarizer by performing stretching and dyeing in a state of a laminated film in which a polyvinyl alcohol layer is formed on a substrate include methods disclosed in JP5048120B, JP5143918B, JP4691205B, JP4751481B, and JP4751486B, and known technologies related to these polarizers can be preferably used.

As the reflective type polarizer, a polarizer in which thin films having different birefringence are laminated, a wire grid type polarizer, a polarizer in which a cholesteric liquid crystal having a selective reflection range and a ¼ wavelength plate are combined, and the like are used.

Among these, for the reason that adhesiveness is further improved, a polarizer containing a polyvinyl alcohol-based resin (a polymer including —$CH_2$—CHOH— as a repeating unit, in particular, at least one selected from the group consisting of polyvinyl alcohol and an ethylene-vinyl alcohol copolymer is preferable) is preferable.

In the present invention, the thickness of the polarizer is not particularly limited, but the thickness is preferably 1 μm to 50 μm, more preferably 2 μm to 30 μm, and even more preferably 3 μm to 20 μm.

[Adhesive Layer]

The adhesive layer of the polarizing plate according to the embodiment of the present invention may be formed from an adhesive. As the adhesive, an adhesive including a resin having a hydroxyl group is preferable, and in addition to a polyvinyl alcohol-based adhesive, an epoxy-based active energy ray curable adhesive, for example, an adhesive which contains an epoxy compound not including an aromatic ring in the molecule as disclosed in JP2004-245925A and is cured by heating or irradiation with an active energy ray, an active energy ray curable adhesive having (a) a (meth) acrylic compound having two or more (meth)acryloyl groups in the molecule, (b) a (meth)acrylic compound having a hydroxyl group in the molecule and having only one polymerizable double bond, and (c) phenol ethylene oxide modified acrylate or nonyl phenol ethylene oxide modified acrylate in a total amount of 100 parts by mass of the (meth)acrylic compounds described in JP2008-174667A, and the like may be used. Among these, a polyvinyl alcohol-based adhesive is most preferable.

The polyvinyl alcohol-based adhesive is an adhesive including modified or unmodified polyvinyl alcohol. The polyvinyl alcohol-based adhesive may contain a crosslinking agent in addition to the modified or unmodified polyvinyl alcohol. Specific examples of the adhesive include an aqueous solution of polyvinyl alcohol or polyvinyl acetal (for example, polyvinyl butyral) and a latex of a vinyl-based polymer (for example, polyvinyl chloride, polyvinyl acetate, or polybutyl acrylate). A particularly preferable adhesive is an aqueous solution of polyvinyl alcohol. In this case, it is preferable that polyvinyl alcohol is completely saponified.

In addition, the epoxy-based active energy ray curable adhesive can be crosslinked with the copolymer according to the present invention since the epoxy group opens by irradiation with active energy rays to generate hydroxyl groups. Therefore, in the present invention, the epoxy-based active energy ray curable adhesive is also included as a hydroxyl group containing adhesive and can be appropriately used.

[Image Display Device]

An image display device according to an embodiment of the present invention is an image display device including the above-described optical film or the above-described polarizing plate, and an image display element.

[Image Display Element]

The image display element used in the present invention is not particularly limited and for example, a liquid crystal cell, an organic electroluminescence (hereinafter, abbreviated as "EL") display panel, a plasma display panel, and the like may be used.

Among these, a liquid crystal cell or an organic EL display panel is preferable, and a liquid crystal cell is more preferable. That is, the image display device according to the embodiment of the present invention is preferably a liquid crystal display device using a liquid crystal cell as an image display element, or an organic EL display device using an organic EL display panel as an image display element, and is more preferably a liquid crystal display device.

<Liquid Crystal Cell>

The liquid crystal cell used in the liquid crystal display device is preferably of a vertical alignment (VA) mode, an optical compensated bend (OCB) mode, an FFS mode, an in-plane switching (IPS) mode, or a twisted nematic (TN) mode, but is not limited thereto.

In a liquid crystal cell of a TN mode, a rod-like liquid crystal molecule is substantially horizontally aligned and further aligned in a twisted state at from 60° to 120° when electric voltage is not applied. The liquid crystal cell of a TN mode is most frequently utilized as a color thin film transistor (TFT) liquid crystal display device and described in many references.

In a liquid crystal cell of a VA mode, a rod-like liquid crystal molecule is substantially vertically aligned when electric voltage is not applied. The liquid crystal cell of a VA mode includes, in addition to (1) a liquid crystal cell of a VA mode in a narrow sense in which a rod-like liquid crystal molecule is substantially vertically aligned when electric voltage is not applied, whereas the liquid crystal molecule is substantially horizontally aligned when electric voltage is applied (as described in JP1990-176625A (JP-H2-176625A)), (2) a liquid crystal cell of a multi-domained VA mode (MVA mode) for enlarging a viewing angle (described in SID97, Digest of Tech. Papers (Proceedings), 28 (1997), page 845), (3) a liquid crystal cell of a mode (n-ASM mode) in which a rod-like liquid crystal molecule is substantially vertically aligned at when electric voltage is not applied and is subjected to twisted multi-domain alignment when electric voltage is applied (described in Proceedings of Japanese Liquid Crystal Society, pages 58 to 59 (1998)), and (4) a liquid crystal cell of a SURVIVAL mode (presented in LCD International 98). In addition, the liquid crystal may have any of a patterned vertical alignment (PVA) type, an optical alignment type, and polymer-sustained alignment (PSA). The details of the above modes are described in JP2006-215326A and JP2008-538819A.

In a liquid crystal cell of an IPS mode, a rod-like liquid crystal molecule is aligned substantially in parallel to the substrate, and by applying a parallel electric field to the substrate surface, the liquid crystal molecule responds in a planar manner. The IPS mode displays black in a state in which electric voltage is not applied, and the absorption axes of a pair of top and bottom polarizing plates cross orthogonally with each other. A method in which leaked light in an inclined direction while displaying black is reduced using an optical compensation sheet so as to improve the viewing angle is disclosed in JP2008-054982A (JP-H10-054982A), JP2009-202323A (JP-H11-202323A), JP2007-292522A (JP-H9-292522A), JP2009-133408A (JP-H11-133408A), JP2009-305217A (JP-H11-305217A), JP2008-307291A (JP-H10-307291A), and the like.

<Organic EL Display Panel>

The organic EL display panel used as an image display element used in the present invention is a display panel configured by using an organic EL element in which an organic light emitting layer (organic electroluminescence layer) is sandwiched between electrodes (between a cathode and an anode). The configuration of the organic EL display panel is not particularly limited, and a known configuration is adopted.

EXAMPLES

The present invention will be described in more detail based on the following Examples. The materials, amount of use, ratio, ratio, details of the treatment, procedures of the treatment, and the like shown in the following Examples can be appropriately changed without departing from the spirit of the present invention. Therefore, it is to be understood that the scope of the present invention should not be interpreted in a limited manner based on Examples shown below.

Synthesis Example 1

Synthesis Example of Copolymer A-5

Into a 300 ml three-neck flask equipped with a stirrer, a thermometer, a reflux condenser, and a nitrogen gas introduction pipe, 6.7 g of cyclohexanone and 1.7 g of isopropanol were put and the temperature was raised to 73° C.

Next, a mixed solution of 12.3 g (29.3 mmol) of 2-(perfluorohexyl)ethyl acrylate, 5.6 g (14.7 mmol) of 4-(4-acryloyloxybutoxy)benzoyloxy phenyl boronic acid, 2.1 g (29.3 mmol) of acrylic acid, 26.4 g of cyclohexanone, 6.6 g of isopropanol, and 0.51 g of an azo polymerization initiator (V-601, manufactured by Wako Pure Chemical Corporation) was added dropwise at a constant rate so that the dropwise addition was completed in 150 minutes. After completion of the dropwise addition, the temperature was raised to 90° C., and stirring was further continued for 4 hours.

Next, 4.2 g (29.3 mmol) of glycidyl methacrylate, 1.5 g (4.7 mmol) of tetrabutylammonium bromide, 0.4 g of p-methoxyphenol, 16.2 g of cyclohexanone, and 4.1 g of isopropanol were put into the flask, the temperature was raised to 80° C., and stirring was continued for 8 hours. Thus, 88.6 g of a cyclohexanone.isopropanol solution of a copolymer represented by Formula (A-5) (hereinafter, abbreviated as a "copolymer A-5") was obtained.

The weight-average molecular weight (Mw) of the copolymer A-5 was 60,300 (calculated in terms of polystyrene by gel permeation chromatography (EcoSEC HLC-8320GPC (manufactured by Tosoh Corporation)) under the measurement conditions of a flow rate of 0.50 ml/min, and a temperature of 40° C. using an eluent NMP and three columns of TSKgel SuperAWM-H (manufactured by Tosoh Corporation)). In addition, the obtained copolymer A-5 had an acid value of 7.3 and the residual carboxylic acid content was 5% by mole.

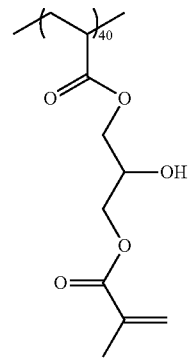

(A-5)

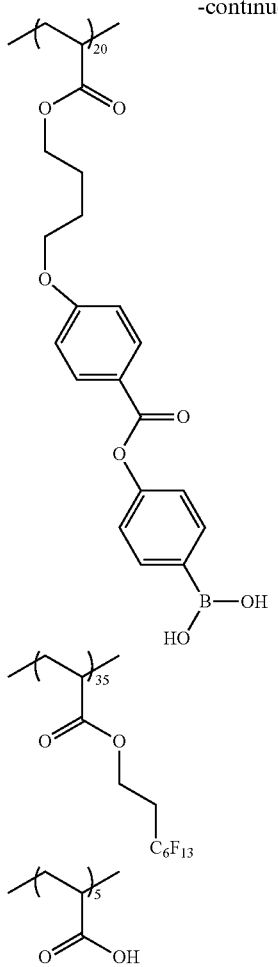

Synthesis Example 2

Synthesis Example of Copolymer A-7

Into a 300 ml three-neck flask equipped with a stirrer, a thermometer, a reflux condenser, and a nitrogen gas introduction pipe, 6.7 g of cyclohexanone and 1.7 g of isopropanol were put and the temperature was raised to 73° C. Next, a mixed solution of 12.3 g (29.3 mmol) of 2-(perfluorohexyl)ethyl acrylate, 5.6 g (14.7 mmol) of 4-(4-acryloyloxybutoxy)benzoyloxy phenyl boronic acid, 2.1 g (29.3 mmol) of acrylic acid, 26.4 g of cyclohexanone, 6.6 g of isopropanol, and 0.51 g of an azo polymerization initiator (V-601, manufactured by Wako Pure Chemical Corporation) was added dropwise at a constant rate so that the dropwise addition was completed in 150 minutes. After 1.3 g of 1,3-propanediol was added, the temperature was raised to 90° C., and stirring was further continued for 4 hours.

Next, 4.2 g (29.3 mmol) of glycidyl methacrylate, 1.5 g (4.7 mmol) of tetrabutylammonium bromide, 0.4 g of p-methoxyphenol, 18.0 g of cyclohexanone, and 4.5 g of isopropanol were put into the flask, the temperature was raised to 80° C., and stirring was continued for 8 hours. Thus, 91.9 g of a cyclohexanone.isopropanol solution of a copolymer represented by Formula (A-7a) (hereinafter, abbreviated as a "copolymer A-7a") was obtained.

The weight-average molecular weight (Mw) of the copolymer A-7a was 11,200 (calculated in terms of polystyrene by gel permeation chromatography (EcoSEC HLC-8320GPC (manufactured by Tosoh Corporation)) under the measurement conditions of a flow rate of 0.50 ml/min, and a temperature of 40° C. using an eluent NMP and three columns of TSKgel SuperAWM-H (manufactured by Tosoh Corporation)). In addition, the obtained copolymer A-7a had an acid value of 5.2 and the residual carboxylic acid content was 3% by mole.

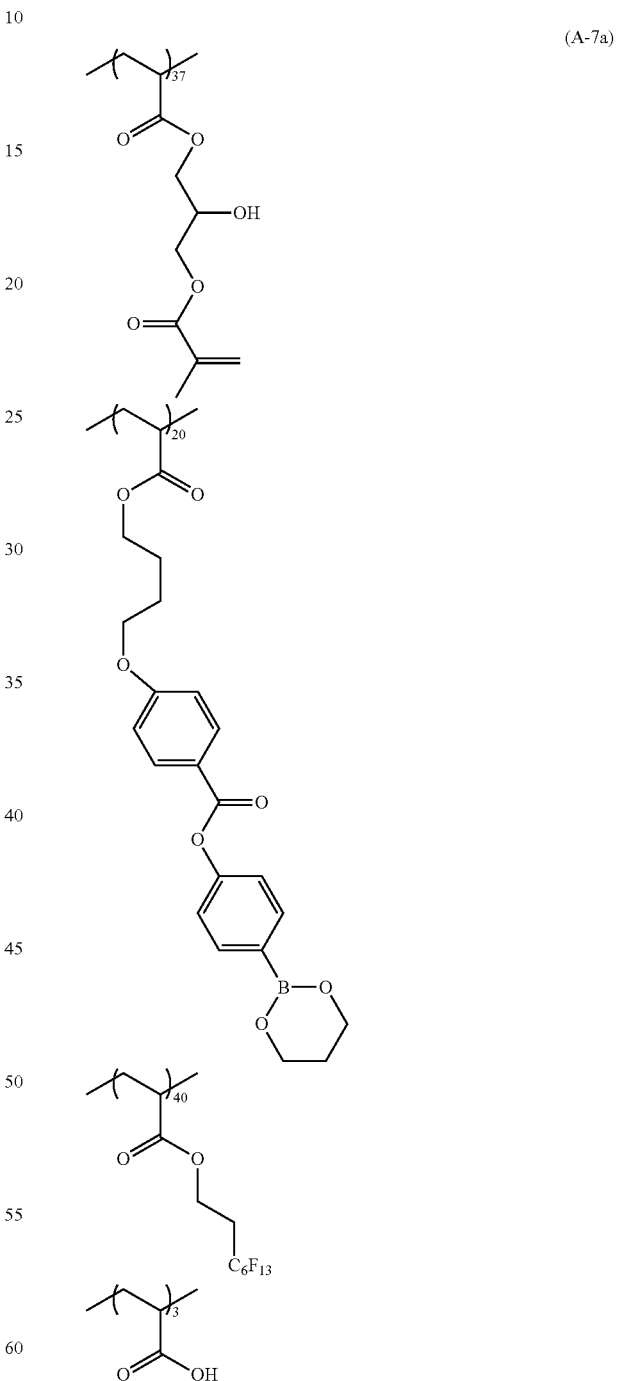

Other Synthesis Examples

A copolymer represented by Formula (A-1) (hereinafter, abbreviated as a "copolymer A-1"), a copolymer represented by Formula (A-4) (hereinafter, abbreviated as a "copolymer A-4"), a copolymer represented by Formula (A-7b) (hereinafter, abbreviated as a "copolymer A-7b"), a copolymer represented by Formula (A-7c) (hereinafter, abbreviated as a "copolymer A-7c"), and a copolymer represented by Formula (A-11) (hereinafter, abbreviated as a "copolymer A-11") were synthesized in the same manner as in Synthesis Examples 1 and 2 described above except that the monomer components were changed.

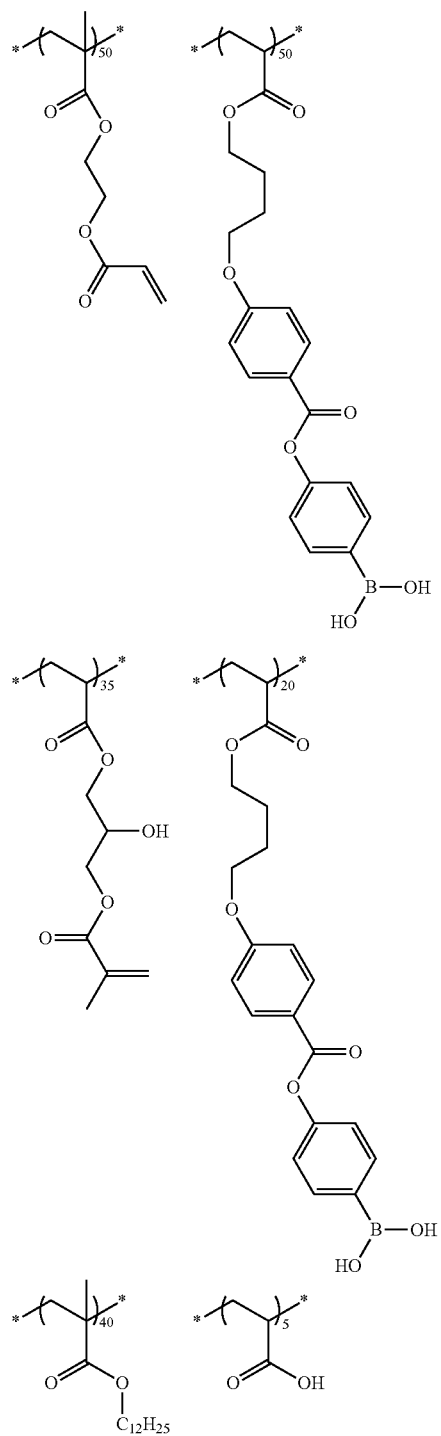

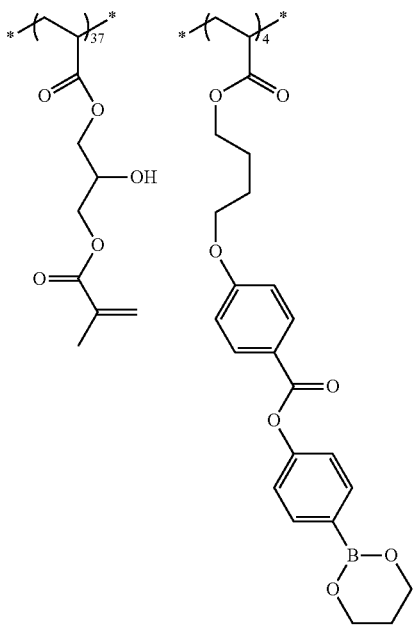

(A-7b)

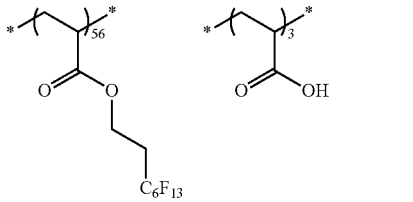

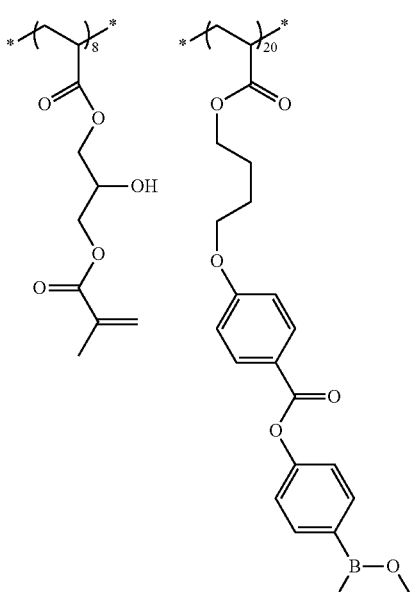

(A-7c)

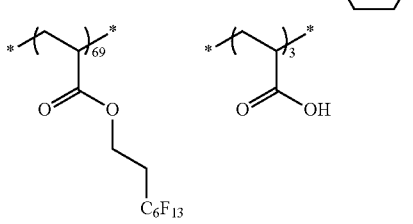

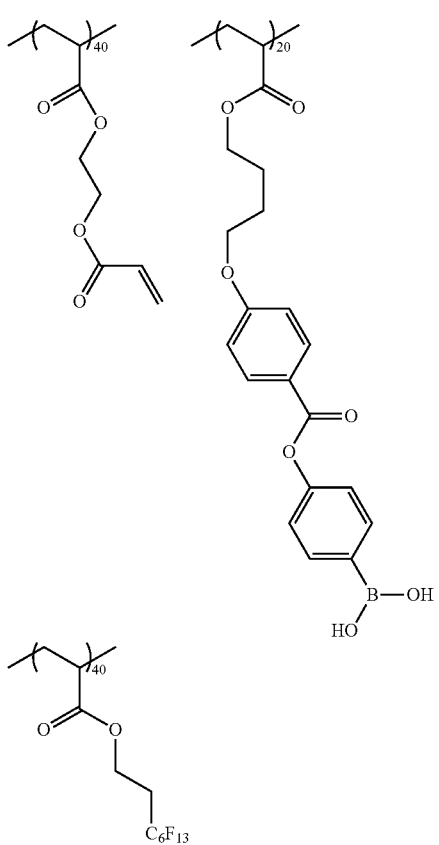

(A-11)

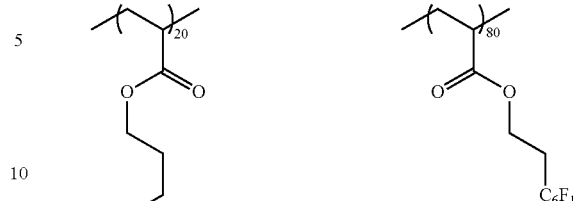

(R-2)

Comparative Synthesis Example 1

A copolymer R-1 was synthesized according to the method described in paragraph of JP2005-248116A.

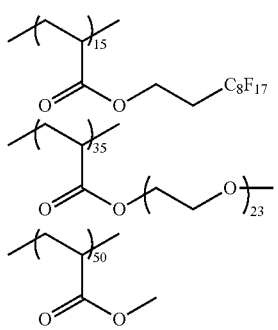

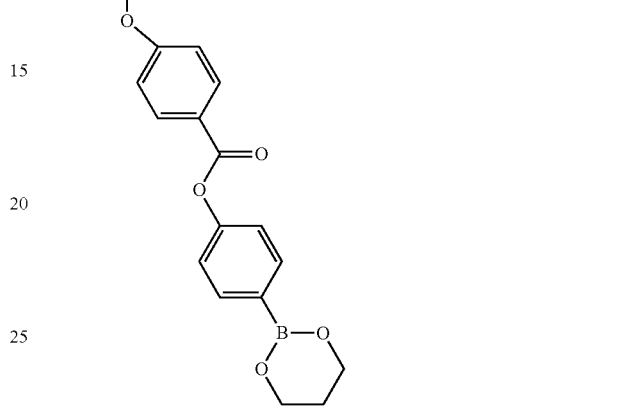

(R-3)

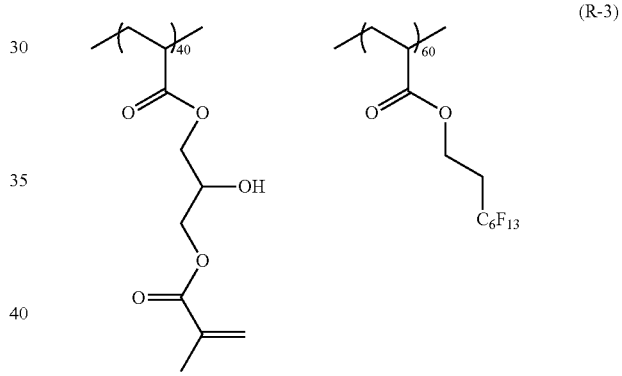

(R-4)

Comparative Synthesis Examples 2 to 4

A copolymer represented by Formula (R-2) (hereinafter, abbreviated as a "copolymer R-2"), a copolymer represented by Formula (R-3) (hereinafter, abbreviated as a "copolymer R-3"), and a copolymer represented by Formula (R-4) (hereinafter, abbreviated as a "copolymer R-4") were synthesized in the same manner as in Synthesis Example 2 described above except that the monomer components were changed.

Regarding each synthesized copolymers, the contents (% by mass) of the repeating units represented by Formulae (I), (II), (III), and (V) and other repeating units are shown in Table 1 below.

TABLE 1

| Copolymer | Repeating unit represented by Formula (I) % by mass | Repeating unit represented by Formula (II) % by mass | Repeating unit represented by Formula (III) % by mass | Repeating unit represented by Formula (V) % by mass | Other repeating units % by mass |
|---|---|---|---|---|---|
| A-1 | 50% | 50% | 0% | 0% | 0% |
| A-4 | 35% | 20% | 0% | 5% | 40% (—C$_{12}$H$_{25}$) |
| A-5 | 40% | 20% | 35% | 5% | 0% |
| A-7a | 37% | 20% | 40% | 3% | 0% |
| A-7b | 37% | 4% | 56% | 3% | 0% |
| A-7c | 8% | 20% | 69% | 3% | 0% |
| A-11 | 40% | 20% | 40% | 0% | 0% |
| R-1 | 0% | 0% | 15% | 0% | 85% |
| R-2 | 0% | 20% | 80% | 0% | 0% |
| R-3 | 40% | 0% | 60% | 0% | 0% |
| R-4 | 30% | 0% | 60% | 10% | 0% |

Examples 1 to 9 and Comparative Examples 1 to 5

<Preparation of Optical Film>

Each synthesized copolymer, each liquid crystal compound shown in Tables 2 to 4 below, and the like were mixed in parts by mass shown in Tables 2 to 4 below and thus liquid crystal compositions were prepared.

In addition, one surface of a cycloolefin polymer film (trade name: ARTON film, manufactured by JSR Corporation. Re=95 nm, Rth=100 nm, film thickness: 25 μm) was subjected to a corona treatment at a discharge amount of 125 W·min/m$^2$.

Thereafter, each prepared liquid crystal composition was applied to the corona-treated surface with a #2.6 wire bar. In order to dry the solvent of the composition and carry out alignment and aging of the liquid crystal compound, heating was performed for 90 seconds with hot air at 70° C.

Next, the film was then irradiated with ultraviolet rays (300 mJ/cm$^2$) at 40° C. under a nitrogen purge with an oxygen concentration of 100 ppm and the alignment of the liquid crystal compound was immobilized. Thus, an optical film was prepared.

As the liquid crystal compound, the alignment aid, the boron compound, the monomer, the polymerization initiator, and the leveling agent shown in Tables 2 to 4 below, the followings were respectively used.

Liquid Crystal Compound G1

Mixture of liquid crystal compounds (RA), (RB), and (RC) below at 83:15:2 (mass ratio)

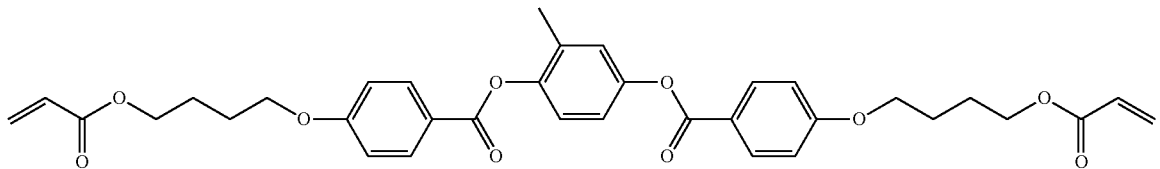
(RA)

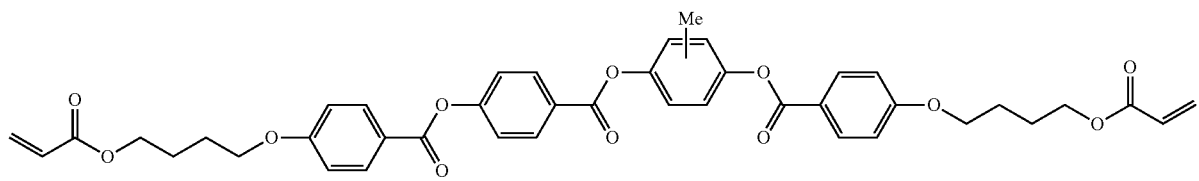
(RB)

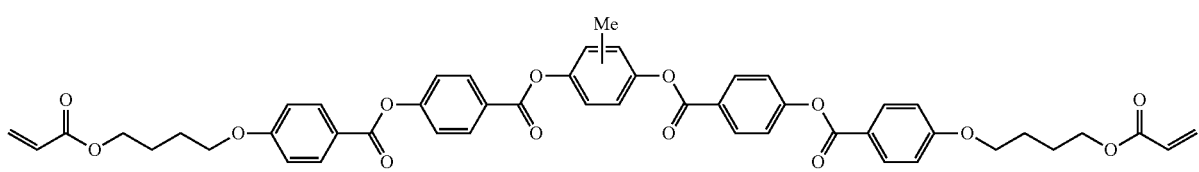
(RC)

Alignment Aid H1

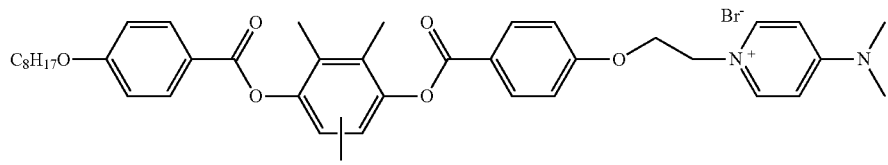

Boron Compound J1

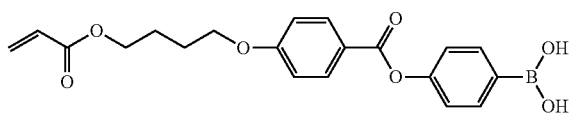 [SMILES: C=CC(=O)OCCCCOc1ccc(C(=O)Oc2ccc(B(O)O)cc2)cc1]

Monomer K1: BISCOAT #360 (manufactured by Osaka Organic Chemical Industry Ltd.)

Polymerization initiator L: OXE-01 (manufactured by BASF A.G)

Leveling Agent M1

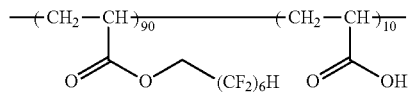

<Preparation of Polarizing Plate>
(Surface Treatment of Film)

A cellulose acetate film (FUJITAC TD40UC, manufactured by Fujifilm Corporation) was immersed in 1.5 mol/L of an aqueous solution of sodium hydroxide (saponification solution) controlled to a temperature of 37° C. for 1 minute and then the film was washed with water. Then, the film was immersed in 0.05 mol/L of an aqueous solution of sulfuric acid for 30 seconds, and further passed through a water washing bath. Then, draining with an air knife was repeated three times, water dripping was performed, and then the film was dried by being retained in a drying zone at 70° C. for 15 seconds. Thus, a cellulose acetate film which was subjected to a saponification treatment was prepared.

<Preparation of Polarizer>

According to Example 1 of JP2001-141926A, a difference in a circumferential speed was imparted to two pairs of nip rolls, stretching was performed in a longitudinal direction, and thus a polarizer having a thickness 12 μm was prepared.

<Lamination>

The prepared polarizer was sandwiched by using each prepared optical film and the prepared saponified cellulose acetate film and then the films and the polarizer were laminated using the following adhesive by a roll-to-roll method such that the absorption axis of the polarizer and the longitudinal direction of the film were parallel to each other.

Here, one surface of the polarizer was arranged such that the coated surface of the above-described optical film was disposed on the polarizer side and the other surface of the polarizer was the above-described cellulose acetate film.

After lamination, the laminate was cured by drying at 70° C. for 10 minutes to prepare a polarizing plate.

(Adhesive)

3% aqueous solution of polyvinyl alcohol (PVA-117H, manufactured by Kuraray Co., Ltd.)

[Alignment Properties]

Regarding the optically anisotropic layer of the prepared optical film, a value of |Rth(550)| with respect to a film thickness of 1 μm of the optically anisotropic layer was calculated and the alignment properties were evaluated according to the following standards. The results are shown in Tables 2 to 4 below.

In a case where the same liquid crystal compound is used, the higher the alignment properties, the larger the value of |Rth(550)| with respect to a film thickness of 1 μm of the optically anisotropic layer.

Therefore, the alignment properties were evaluated by the value of |Rth(550)| with respect to a film thickness of 1 μm of the optically anisotropic layer.

A: 120 nm/μm or greater
B: 110 nm/μm or greater and less than 120 nm/μm
C: 100 nm/μm or greater and less than 110 nm/μm
D: less than 100 nm/μm Here, in a case where the evaluation results are A, B and C, there is no practical problem and the evaluation is preferably A.

[Surface State]

Each polarizing plate was disposed to form crossed nicols, the prepared optical film was inserted between the polarizing plates, and the planar performance of the optically anisotropic layer of the prepared optical film was observed.

The extent of unevenness was visually evaluated and evaluated at four stages A to D. The results are shown in the following Tables 2 to 4 below.

A: Unevenness was not observed at all.
B: Slight unevenness was visually recognized but not noticeable.
C: Unevenness was visually recognized but was not a practically problematic level.
D: Unevenness was clearly visually recognized and very noticeable.

[Adhesiveness]

The adhesiveness was evaluated by a crosscut method described in JIS-K-5600-5-6-1.

The optical film surface of the prepared polarizing plate was cut at intervals of 1 mm to form 100 cross cuts and an adhesion test was performed using a cellophane tape (manufactured by Nichiban Co., Ltd.). After attaching a new cellophane tape, the cellophane tape was peeled off and the surface state was evaluated according to the following standards. The results are shown in Tables 2 to 4 below. The crosscuts were formed by making cuts from the cycloolefin polymer film (support) side of the optical film to the surface of the polarizer.

A: Squares of the cross cuts were not peeled off.
B: 50% or more and less than 100% of squares of the cross cuts were not peeled off.
C: 20% or more and less than 50% of squares of the cross cuts were not peeled off.
D: Less than 20% of squares of the cross cuts were not peeled off.

Here, in a case where the evaluation results are A, B and C, there is no practical problem and the evaluation is preferably A.

TABLE 2

|  | Comparative Example 1 | | Comparative Example 2 | | Comparative Example 3 | | Comparative Example 4 | | Comparative Example 5 | |
| --- | --- | --- | --- | --- | --- | --- | --- | --- | --- | --- |
|  | Kind | Parts by mass | Kind | Parts by mass | Kind | Parts by mass | Kind | Parts by mass | Kind | Parts by mass |
| Liquid crystal compound | G1 | 100 | G1 | 100 | G1 | 100 | G1 | 100 | G1 | 100 |
| Alignment aid | H1 | 1 | H1 | 1 | H1 | 1 | H1 | 1 | H1 | 1 |
| Boron compound | J1 | 4.5 | J1 | 4.5 | J1 | 4.5 | J1 | 4.5 | J1 | 4.5 |
| Monomer | K1 | 8 | K1 | 8 | K1 | 8 | K1 | 8 | K1 | 8 |
| Polymerization initiator | L1 | 5 | L1 | 5 | L1 | 5 | L1 | 5 | L1 | 5 |
| Leveling agent Copolymer |  |  | R-1 | 0.5 | R-2 | 5.0 | R-3 | 5.0 | R-4 | 5.0 |
| Solvent | Acetone (70%) Methyl acetate (20%) Methanol (10%) | | Acetone (70%) Methyl acetate (20%) Methanol (10%) | | Acetone (70%) Methyl acetate (20%) Methanol (10%) | | Acetone (70%) Methyl acetate (20%) Methanol (10%) | | Acetone (70%) Methyl acetate (20%) Methanol (10%) | |
| Concentration of solid content | 25% | | 25% | | 25% | | 25% | | 25% | |
| Alignment properties | D | | D | | D | | D | | A | |
| Surface state | D | | A | | D | | D | | A | |
| Adhesiveness | D | | D | | D | | D | | D | |

TABLE 3

|  | Example 1 | | Example 2 | | Example 3 | | Example 4 | | Example 5 | |
| --- | --- | --- | --- | --- | --- | --- | --- | --- | --- | --- |
|  | Kind | Parts by mass | Kind | Parts by mass | Kind | Parts by mass | Kind | Parts by mass | Kind | Parts by mass |
| Liquid crystal compound | G1 | 100 | G1 | 100 | G1 | 100 | G1 | 100 | G1 | 100 |
| Alignment aid | H1 | 1 | H1 | 1 | H1 | 1 | H1 | 1 | H1 | 1 |
| Boron compound |  |  |  |  | J1 | 4.5 | J1 | 4.5 | J1 | 4.5 |
| Monomer | K1 | 8 | K1 | 8 | K1 | 8 | K1 | 8 | K1 | 8 |
| Polymerization initiator | L1 | 5 | L1 | 5 | L1 | 5 | L1 | 5 | L1 | 5 |
| Leveling agent Copolymer | A-1 | 5.0 | A-4 | 5.0 | A-11 | 0.5 | A-5 | 0.5 | A-7a | 0.5 |
| Solvent | Acetone (70%) Methyl acetate (20%) Methanol (10%) | | Acetone (70%) Methyl acetate (20%) Methanol (10%) | | Acetone (70%) Methyl acetate (20%) Methanol (10%) | | Acetone (70%) Methyl acetate (20%) Methanol (10%) | | Acetone (70%) Methyl acetate (20%) Methanol (10%) | |
| Concentration of solid content | 25% | | 25% | | 25% | | 25% | | 25% | |
| Alignment properties | C | | C | | B | | A | | A | |
| Surface state | C | | C | | A | | A | | A | |
| Adhesiveness | C | | B | | A | | A | | A | |

TABLE 4

|  | Example 6 | | Example 7 | | Example 8 | | Example 9 | |
| --- | --- | --- | --- | --- | --- | --- | --- | --- |
|  | Kind | Parts by mass | Kind | Parts by mass | Kind | Parts by mass | Kind | Parts by mass |
| Liquid crystal compound | G1 | 100 | G1 | 100 | G1 | 100 | G1 | 100 |
| Alignment aid | H1 | 1 | H1 | 2 | H1 | 2 | H1 | 2 |
| Boron compound |  |  | J1 | 4.5 | J1 | 4.5 | J1 | 4.5 |
| Monomer | K1 | 8 | K1 | 8 | K1 | 8 | K1 | 8 |
| Polymerization initiator | L1 | 5 | L1 | 5 | L1 | 5 | L1 | 5 |
| Leveling agent |  |  | M1 | 0.3 | M1 | 0.3 | M1 | 0.3 |
| Copolymer | A-7a | 0.5 | A-7a | 0.5 | A-7b | 0.5 | A-7c | 0.5 |
| Solvent | Acetone (70%) Methyl acetate (20%) Methanol (10%) | | Acetone (70%) Methyl acetate (20%) Methanol (10%) | | Acetone (70%) Methyl acetate (20%) Methanol (10%) | | Acetone (70%) Methyl acetate (20%) Methanol (10%) | |
| Concentration of solid content | 25% | | 25% | | 25% | | 25% | |
| Alignment properties | A | | A | | A | | A | |
| Surface state | A | | A | | A | | A | |
| Adhesiveness | B | | A | | C | | C | |

From the results shown in Tables 2 to 4, it was found that in a case where the polymer compound of the present invention was not blended, the adhesiveness between the polarizer and the optically anisotropic layer was inferior and the alignment properties and the surface state were also inferior (Comparative Examples 1 to 5).

In contrast, in a case where the polymer compound of the present invention was blended, it was found that the alignment properties were excellent, the surface state of the optically anisotropic layer to be formed was improved, and the adhesiveness with the polarizer was also improved (Examples 1 to 9).

Particularly, from the comparison between Example 3 and Example 4, it was found that the alignment properties of the liquid crystal compound were improved in a case where the copolymer has the repeating unit (V part) represented by Formula (V).

In addition, from the comparison between Example 5 and Example 6, it was found that the adhesiveness with the polarizer was improved in a case where the copolymer has the boron compound represented by Formula (VI).

Further, from the comparison of Examples 7 to 9, it was found that in a case where the content of the repeating unit represented by Formula (I) is 10% to 50% by mass with respect to all repeating units, the content of the repeating unit represented by Formula (II) is 5% to 50% by mass with respect to all repeating units, and the content of the repeating unit represented by Formula (III) is 10% to 60% by mass with respect to all repeating units, the adhesiveness with the polarizer was further improved.

What is claimed is:
1. A liquid crystal composition comprising:
a copolymer having a repeating unit represented by Formula (I) and a repeating unit represented by Formula (II); and
a liquid crystal compound,

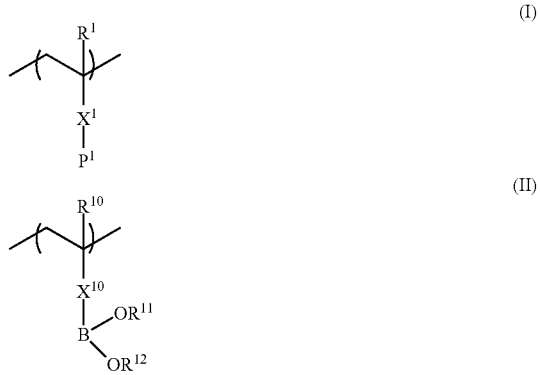

in Formula (I), $R^1$ represents a hydrogen atom or an alkyl group having 1 to 20 carbon atoms; $X^1$ represents a single bond or a divalent linking group selected from the group consisting of —O—, —S—, —COO—, —OCO—, —CONR$^2$—, —NR$^2$COO—, —CR$^2$N—, a substituted or unsubstituted divalent aliphatic group, a substituted or unsubstituted divalent aromatic group, and a combination thereof; $R^2$ represents a hydrogen atom, an alkyl group having 1 to 20 carbon atoms, or —$X^1$—$P^1$; and $P^1$ represents a polymerizable group, in Formula (II), $R^{10}$ represents a hydrogen atom or an alkyl group having 1 to 20 carbon atoms; $R^{11}$ and $R^{12}$ each independently represent a hydrogen atom, a substituted or unsubstituted aliphatic hydrocarbon group, a substituted or unsubstituted aryl group, or a substituted or unsubstituted heteroaryl group; $R^{11}$ and $R^{12}$ may be linked to each other through an alkylene linking group, an arylene linking group, or a linking group of a combination thereof; $X^{10}$ represents a single bond or a divalent linking group selected from the group consisting of —O—, —S—, —COO—, —OCO—, —$CONR^{13}$—, —$NR^{13}COO$—, —$CR^{13}N$—, a substituted or unsubstituted divalent aliphatic group, a substituted or unsubstituted divalent aromatic group, and a combination thereof; and $R^{13}$ represents a hydrogen atom or an alkyl group having 1 to 20 carbon atoms, and wherein the weight-average molecular weight of the copolymer is 1000 to 200000, the content of the repeating unit represented by Formula (I) is 5% to 80% by mass with respect to all repeating units, and the content of the repeating unit represented by Formula (II) is 3% to 80% by mass with respect to all repeating units.

2. The liquid crystal composition according to claim 1, wherein the copolymer further has a repeating unit represented by Formula (III),

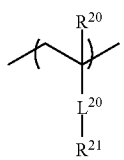

(III)

in Formula (III), $R^{20}$ represents a hydrogen atom or an alkyl group having 1 to 20 carbon atoms; $R^{21}$ represents an alkyl group having 4 to 20 carbon atoms, an alkyl group having 1 to 20 carbon atoms in which at least one hydrogen atom is substituted with a fluorine atom, or a monovalent organic group including —Si($R^{a3}$)($R^{a4}$)O—; $R^{a3}$ and $R^{a4}$ each independently represent an alkyl group, a haloalkyl group, or an aryl group; and $L^{20}$ represents a divalent linking group selected from the group consisting of —O—, —COO—, —OCO—, a divalent aliphatic group, and a combination thereof.

3. The liquid crystal composition according to claim 2, wherein $R^{21}$ in Formula (III) is an alkyl group having 1 to 20 carbon atoms in which at least one hydrogen atom is substituted with a fluorine atom.

4. The liquid crystal composition according to claim 3, wherein the repeating unit represented by Formula (III) is a repeating unit represented by Formula (IV),

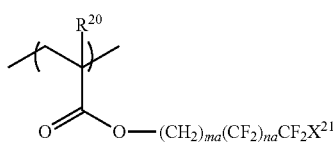

(IV)

in Formula (IV), $R^{20}$ represents a hydrogen atom or an alkyl group having 1 to 20 carbon atoms; ma and na each independently represent an integer of 0 to 19; where ma and na represent an integer of 0 to 19 in total; and $X^{21}$ represents a hydrogen atom or a fluorine atom.

5. The liquid crystal composition according to claim 2, wherein a content of the repeating unit represented by Formula (I) is 10% to 50% by mass with respect to all repeating units, a content of the repeating unit represented by Formula (II) is 5% to 50% by mass with respect to all repeating units, and a content of the repeating unit represented by Formula (III) is 10% to 60% by mass with respect to all repeating units in the copolymer.

6. The liquid crystal composition according to claim 1, wherein the polymerizable group represented by $P^1$ in Formula (I) is any polymerizable group selected from the group consisting of groups represented by Formulae (P-1) to (P-7),

(P-1)

(P-2)

(P-3)

(P-4)

(P-5)

(P-6)

(P-7)

in Formulae (P-1) to (P-7), * represents a bonding position with $X^1$; $R^3$ represents a hydrogen atom or an alkyl group having 1 to 5 carbon atoms; and two $R^3$'s may be the same or different from each other and may be linked to each other to form a ring structure.

7. The liquid crystal composition according to claim 1, wherein the copolymer further has a repeating unit represented by Formula (V),

(V)

in Formula (V), $R^{30}$ represents a hydrogen atom or an alkyl group having 1 to 20 carbon atoms.

8. The liquid crystal composition according to claim 1, wherein the liquid crystal compound is a rod liquid crystal compound having a polymerizable group or a disk liquid crystal compound having a polymerizable group.

9. The liquid crystal composition according to claim 1, further comprising:
a compound represented by Formula (VI) at a content of 0.5% to 7.0% by mass with respect to the liquid crystal compound, $$(Z)_n\text{-}L^{100}\text{-}(Q)_m \qquad \text{(VI)}$$

in Formula (VI), Z represents a substituent having a polymerizable group; n represents an integer of 0 to 4; in a case where n is 2 or greater, two or more Z's may be the same or different from each other; Q represents a substituent containing at least one boron atom; m represents 1 or 2; in a case where m is 2, two Q's may be the same or different from each other; $L^{100}$ represents an n+m valent linking group; where in a case where n is 0 and m is 1, $L^{100}$ represents a hydrogen atom, a substituted or unsubstituted alkyl group, a substituted or unsubstituted alkenyl group, a substituted or unsubstituted alkynyl group, a substituted or unsubstituted aryl group, or a substituted or unsubstituted heteroaryl group.

10. The liquid crystal composition according to claim 2, further comprising:
a compound represented by Formula (VI) at a content of 0.5% to 7.0% by mass with respect to the liquid crystal compound, $$(Z)_n\text{-}L^{100}\text{-}(Q)_m \qquad \text{(VI)}$$

in Formula (VI), Z represents a substituent having a polymerizable group; n represents an integer of 0 to 4; in a case where n is 2 or greater, two or more Z's may be the same or different from each other; Q represents a substituent containing at least one boron atom; m represents 1 or 2; in a case where m is 2, two Q's may be the same or different from each other; $L^{100}$ represents an n+m valent linking group; where in a case where n is 0 and m is 1, $L^{100}$ represents a hydrogen atom, a substituted or unsubstituted alkyl group, a substituted or unsubstituted alkenyl group, a substituted or unsubstituted alkynyl group, a substituted or unsubstituted aryl group, or a substituted or unsubstituted heteroaryl group.

11. The liquid crystal composition according to claim 3, further comprising:
a compound represented by Formula (VI) at a content of 0.5% to 7.0% by mass with respect to the liquid crystal compound, $$(Z)_n\text{-}L^{100}\text{-}(Q)_m \qquad \text{(VI)}$$

in Formula (VI), Z represents a substituent having a polymerizable group; n represents an integer of 0 to 4; in a case where n is 2 or greater, two or more Z's may be the same or different from each other; Q represents a substituent containing at least one boron atom; m represents 1 or 2; in a case where m is 2, two Q's may be the same or different from each other; $L^{100}$ represents an n+m valent linking group; where in a case where n is 0 and m is 1, $L^{100}$ represents a hydrogen atom, a substituted or unsubstituted alkyl group, a substituted or unsubstituted alkenyl group, a substituted or unsubstituted alkynyl group, a substituted or unsubstituted aryl group, or a substituted or unsubstituted heteroaryl group.

12. The liquid crystal composition according to claim 4, further comprising:
a compound represented by Formula (VI) at a content of 0.5% to 7.0% by mass with respect to the liquid crystal compound, $$(Z)_n\text{-}L^{100}\text{-}(Q)_m \qquad \text{(VI)}$$

in Formula (VI), Z represents a substituent having a polymerizable group; n represents an integer of 0 to 4; in a case where n is 2 or greater, two or more Z's may be the same or different from each other; Q represents a substituent containing at least one boron atom; m represents 1 or 2; in a case where m is 2, two Q's may be the same or different from each other; $L^{100}$ represents an n+m valent linking group; where in a case where n is 0 and m is 1, $L^{100}$ represents a hydrogen atom, a substituted or unsubstituted alkyl group, a substituted or unsubstituted alkenyl group, a substituted or unsubstituted alkynyl group, a substituted or unsubstituted aryl group, or a substituted or unsubstituted heteroaryl group.

13. An optical film comprising:
an optically anisotropic layer obtained by polymerizing the liquid crystal composition according to claim 1.

14. The optical film according to claim 13, further comprising:
a support,
wherein the optically anisotropic layer is provided on the support.

15. The optical film according to claim 14, wherein the copolymer included in the liquid crystal composition according to claim 1 is unevenly distributed on an air interface side of the optically anisotropic layer.

16. The optical film according to claim 14, wherein the optically anisotropic layer is an optically anisotropic layer that is obtained by polymerizing the liquid crystal composition according to claim 9, and the compound represented by Formula (VI) included in the liquid crystal composition according to claim 9 is unevenly distributed on the support side of the optically anisotropic layer.

17. The optical film according to claim 14, wherein the support is a cellulose acylate-based film or a cycloolefin-based film.

18. A polarizing plate comprising:
the optical film according to claim 13; and
a polarizer,
wherein the optically anisotropic layer included in the optical film and the polarizer are laminated through an adhesive layer.

19. An image display device comprising:
the optical film according to claim 13; and
an image display element.

20. An image display device comprising:
the polarizing plate according to claim 18; and
an image display element.

21. The liquid crystal composition according to claim 1, wherein $X^1$ represents a divalent linking group selected from the group consisting of —O—, —S—, —COO—, —OCO—, —CONR$^2$—, —NR$^2$COO—, —CR$^2$N—, a substituted or unsubstituted divalent aliphatic group, a substituted or unsubstituted divalent aromatic group, and a combination thereof; $R^2$ represents a hydrogen atom, an alkyl group having 1 to 20 carbon atoms, or —$X^1$—$P^1$; and $P^1$ represents a polymerizable group.

22. The liquid crystal composition according to claim 1, wherein the polymerizable group represented by $P^1$ in Formula (I) is any polymerizable group selected from the group consisting of groups represented by Formulae (P-1) to (P-3)

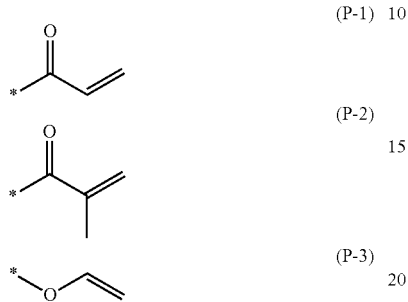

in Formulae (P-1) to (P-3), * represents a bonding position with $X^1$.

* * * * *